United States Patent
Kasuya et al.

[11] Patent Number: 6,139,463
[45] Date of Patent: Oct. 31, 2000

[54] AUTOMATIC TRANSMISSION FOR VEHICLE

[75] Inventors: Satoru Kasuya; Kazumasa Tsukamoto; Masahiro Hayabuchi; Masaaki Nishida, all of Anjo, Japan

[73] Assignee: Aisin AW Ltd., Co., Anjo, Japan

[21] Appl. No.: 09/325,434

[22] Filed: Jun. 4, 1999

[30] Foreign Application Priority Data

Dec. 21, 1998 [JP] Japan ................................. 10-376137
Apr. 16, 1999 [JP] Japan ................................. 11-110189

[51] Int. Cl.$^7$ ....................................................... F16H 3/62
[52] U.S. Cl. ........................... 475/275; 475/279; 475/282
[58] Field of Search ................................... 475/269–282, 475/296, 297

[56] References Cited

U.S. PATENT DOCUMENTS

| | | | |
|---|---|---|---|
| 4,347,765 | 9/1982 | Leonard et al. | |
| 5,106,352 | 4/1992 | Lepelletier . | |
| 5,122,103 | 6/1992 | Nakawaki et al. | 475/278 |
| 5,495,778 | 3/1996 | Mochizuki . | |
| 5,816,972 | 10/1998 | Park | 475/284 |
| 5,823,910 | 10/1998 | Park | 475/271 |

*Primary Examiner*—Khoi Q. Ta
*Attorney, Agent, or Firm*—Oliff & Berridge, PLC

[57] ABSTRACT

An automatic transmission comprises a reduction planetary gear, two clutches transmitting a decelerated rotation transmitted from the reduction planetary gear, and a planetary gear set comprising two elements to which the decelerated rotation is inputted through the two clutches. The reduction planetary gear and the two clutches are arranged in one side of the planetary gear set. The second clutch is closer to the planetary gear set than the clutch. The input side member of the first clutch is connected to an output element of the reduction planetary gear and the input side member of the second clutch. The output side member of the first clutch is extended through the radial inner space of the second clutch and connected to one of the two elements of the planetary gear set. Thus, no member is arranged in the radial outer side of the both clutches, and the both clutches are radially enlarged.

20 Claims, 19 Drawing Sheets

FIG. 3

| | C-1 | C-2 | C-3 | B-1 | B-2 | B-3 | F-1 | F-2 | Gear Ratio | Step |
|---|---|---|---|---|---|---|---|---|---|---|
| P | | | | | | | | | | |
| REV | | | ○ | | | ○ | | | 3.394 | |
| N | | | | | | | | | | |
| 1ST | ○ | | | | | △ | | ○ | 4.148 | 1.75 |
| 2ND | ○ | | | △ | ○ | | ○ | | 2.370 | 1.52 |
| 3RD | ○ | | ○ | | ● | | | | 1.556 | 1.35 |
| 4TH | ○ | ○ | | | ● | | | | 1.155 | 1.34 |
| 5TH | | ○ | ○ | | ● | | | | 0.859 | 1.25 |
| 6TH | | ○ | | ○ | ● | | | | 0.686 | |

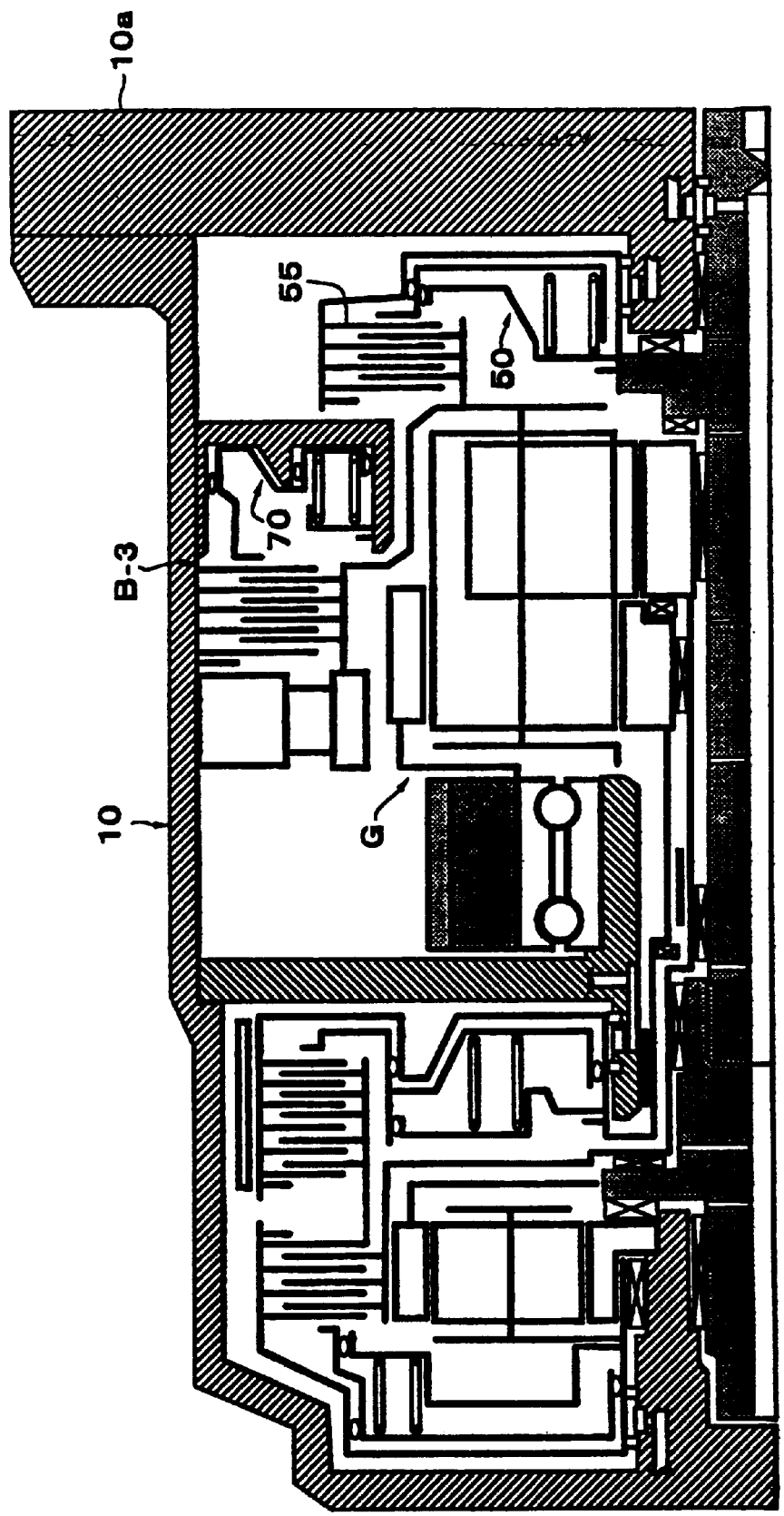

AUTOMATIC TRANSMISSION FOR VEHICLE

BACKGROUND OF THE INVENTION

1. Field of the Invention

The invention relates to an automatic transmission for a vehicle. More specifically, it relates to the arrangement of the each transmission structural element in the gear train.

2. Description of the Related Art

An automatic transmission for a vehicle is required to multiply the gear ratios for an improvement of driving performance and fuel consumption. According to the requirement, the transmission mechanism tends to transit from the mechanism having four forward speeds to the mechanism having five forward speeds. For achieving further multiplication of the gear stages in the limited mounting space of a vehicle, a reduction in the number of elements of the gear train and a simplification of the mechanism are needed. A gear train, which achieves six forward speeds and one reverse speed with a planetary gear set having minimum shift elements, is suggested in U.S. Pat. No. 5,106,352. In this gear train, six forward speeds are established by transmitting rotation inputted to the shift mechanism and two decelerated rotations decelerated from the input rotation are inputted to the planetary gear set having four shift elements.

In the aforementioned gear train, a number of shift elements for establishing gear stages and a number of needed clutches and brakes are reasonable. However, the gear train has problems which have to be practically improved. In the gear train, two clutches are needed for inputting the decelerated rotations from the reduction planetary gear to two different elements of the planetary gear set. These clutches need larger torque capacities than a clutch inputted a non-decelerated rotation. In the aforementioned structure, the two clutches for transmitting the decelerated rotations are arranged on one side of the reduction planetary gear, and a connecting member for connecting one clutch to one element of the planetary gear set is arranged in a position radially outward of the other clutch. Therefore, the diameter of the other clutch is limited, and it is difficult to obtain the capacity needed by increasing the diameter of the clutch. As a result, an increase in the number of the frictional members is required for obtaining the needed capacity which is usually set based on the diameter of the frictional member and the number of the frictional members. Therefore, the size and the weight of the transmission are increased because of the increase in the axial size.

SUMMARY OF THE INVENTION

In view of the above problem associated with the related art, an object of the invention is to provide an automatic transmission having a shift mechanism, which establishes multiple gear stages by inputting two decelerated rotations to a planetary gear set, and obtaining enough torque capacity of two decelerated rotation input clutches without increasing the size of the shift mechanism.

For achieving the aforementioned object, in the invention, an automatic transmission for a vehicle comprises a reduction planetary gear, two clutches transmitting a decelerated rotation which is transmitted through at least the reduction planetary gear, and a planetary gear set inputted the decelerated rotation which is transmitted through the two clutches. The automatic transmission establishes multistage gear ratios by the reduction planetary gear, the two clutches, and the planetary gear set. In the automatic transmission, the reduction planetary gear and first and third clutches, which are the two clutches that transmit decelerated rotation, are arranged on one side of the planetary gear set. The first and third clutches input the decelerated rotation transmitted through the reduction planetary gear to two different elements of the planetary gear set. The third clutch is arranged closer to the planetary gear set than the first clutch. An input side member of the first clutch is connected to an output element of the reduction planetary gear and an input side member of the third clutch, and an output side member of the first clutch is extended through an inner space of the third clutch and connected to one of the two elements of the planetary gear set.

In accordance with another aspect of the invention, one element of the reduction planetary gear is fixed to a boss portion extended from the transmission case.

In accordance with another aspect of the invention, the transmission case comprises a support wall, the first clutch is arranged on the boss portion, and the third clutch is arranged adjacent to the support wall.

In accordance with another aspect of the invention, the transmission comprises a plurality of parallel shafts, and the output member is a counter gear, and the counter gear is arranged on the other side of the support wall against the third clutch.

In the aforementioned structure, the support wall comprises a second cylindrical portion supporting the counter gear.

In accordance with another aspect of the invention, the third clutch is supported on a first cylindrical portion axially extended from the support wall.

In accordance with another aspect of the invention, the input side member of the first clutch is a clutch drum, of which a hydraulic servo is formed in the inside, and arranged in order that a cylinder of the hydraulic servo opens to the reduction planetary gear.

In accordance with another aspect of the invention, the output side member of the third clutch in a clutch drum, of which a hydraulic servo is formed in the inside, arranged in order that a cylinder of the hydraulic servo opens to the opposite side against the support wall, and connected to one element of the planetary gear set.

In accordance with another aspect of the invention, the first engaging member is a band brake in which the outer surface of the clutch drum of the third clutch is an engaging surface engaged by a band.

In accordance with another aspect of the invention, the transmission case comprises a support wall, the first clutch is arranged on one side of the support wall, and the third clutch is arranged on the other side.

In accordance with another aspect of the invention, the first and third clutches are supported on a cylindrical portion axially extended from the support wall.

In an embodiment where the transmission establishes six forward speeds, a first element of the planetary gear set is connected to the output side member of the first clutch, a second element is connected to an output side member of the third clutch and engages the transmission case through a first engaging member, a third element is connected to an output side member of a second clutch, which is inputted a non-decelerated rotation, and engages the transmission case through a second engaging member, and shift rotations are outputted from a fourth element.

In accordance with another aspect of the invention, the second clutch is arranged adjacent to the reduction planetary gear.

In accordance with another aspect of the invention, the second clutch is arranged on the inner side of the frictional members of the first and third clutches.

In accordance with another aspect of the invention, an input side member of the second clutch is a clutch drum, and the clutch drum is an input member inputting a rotation to the reduction planetary gear.

In accordance with another aspect of the invention, the output side member of the second clutch is a clutch drum, and the clutch drum is connected through an intermediate shaft to the third element of the planetary gear set.

In accordance with another aspect of the invention, a frictional member, which connects between the input side member and the output side member, of the second clutch is arranged in the radial outer position of the reduction planetary gear.

OPERATION AND EFFECTS OF THE INVENTION

In the structure of the invention, the input side member of the third clutch is connected through the input side member of the first clutch to the output element of the reduction planetary gear, and the output side member of the first clutch is extended through the inner space of the third clutch and connected to one of the two elements of the planetary gear set. Therefore, a member, which transmits the output rotation from the reduction planetary gear through the first and third clutches to the planetary gear set, is not needed to be arranged in the radial outer position of both clutches. As a result, the diameter of the first and third clutches, which transmit the torque amplified through the reduction planetary gear, can be increased. Therefore, it becomes easy to obtain enough torque transmission capacity without increasing the axial size of the frictional member caused by increasing the number of frictional members. As a result, the transmission is more compact.

One element of the reduction planetary gear is fixed to the transmission case so that a support is not needed.

A hydraulic pressure is applied to the hydraulic servo of the third clutch from the support wall closed to the hydraulic servo. Therefore, a hydraulic path for applying the hydraulic pressure to the hydraulic servo is shortened so that a responsiveness to the application of the hydraulic pressure is improved. Further, the axial size of the transmission is increased by providing the support wall, however, the axial size of the first and third clutches are able to be reduced because the enough torque transmission capacity is obtained by increasing the diameters of both clutches. The diameters are able to be increased because no member is extended in the radial outer space of the first and third clutches. Therefore, the increase of the axial size of the transmission is minimized.

The support wall for supporting the counter gear and the support wall for applying the hydraulic pressure to the third clutch are a common support wall so that the axial size of the transmission is reduced.

The counter gear, which transmits the torque amplified by a shift, is supported by the support wall.

A hydraulic pressure is directly applied to the hydraulic servo of the third clutch from the cylindrical portion of the support wall without being applied through another rotating member. Therefore, a number of seal rings, which are arranged for sealing the hydraulic path, is reduced, so that a sliding load caused by the seal rings is reduced. As a result, the efficiency of the transmission is improved.

The input side member of the first clutch is the clutch drum, and the drum is arranged in a mostly radial outer position of the shift mechanism. Therefore, it is easy to detect an input rotation needed for a transmission control without arranging a sensor in a deep position of the transmission case. Further, the hydraulic servo faces the reduction planetary gear side so that a complicated arrangement of the connecting member, which is caused by the frictional member being arranged in the radial outer space of the reduction planetary gear, is prevented.

The hydraulic servo of the third clutch faces the opposite side of the support wall so that a complicated arrangement of the connecting member, which is caused by the frictional member being arranged in the radial outer space of the reduction planetary gear, is prevented. Further, the clutch drum is supported by the support wall and connected to the input element of the planetary gear set without a complicated arrangement of the connecting member.

The first engaging member is a band brake. The band brake occupies a relatively small space in the radial direction. Therefore, there is a larger radial outer space around the third clutch and the diameter of the third clutch is able to be increased by radially superposing the first engaging member and the third clutch which are connected to the second element of the planetary gear set. The torque transmission capacity is obtained by increasing the diameter of the clutch. As a result, the axial size of the clutch is reduced.

Hydraulic pressures are applied to the hydraulic servos of the first and third clutches from the support wall closed to both clutches. Therefore, hydraulic paths for applying the hydraulic pressures to the hydraulic servos of the both clutches are shortened, and the lengths of the hydraulic paths are almost equal. Therefore, the responsiveness of each clutch to the application of the hydraulic pressure is improved, and control characteristics of the clutches are accommodated. Further, the axial size of the transmission is increased by providing the support wall, however, the axial size of the first and third clutches are able to be reduced because enough torque transmission capacity is obtained by increasing the diameters of both clutches. The diameters are able to be increased because no connecting member is extended in the radial outer space of the first and third clutches. Therefore, the increase of the axial size of the transmission is minimized.

The first and third clutches are supported by the support wall integrated with the transmission case. Therefore, the supports are more stable compared with a case in which the clutches are supported through a movable member, such as a rotating shaft, to the transmission case. Further, hydraulic pressures are directly applied to the hydraulic servos of the first and third clutches from the support wall without being applied through another rotating member. Therefore, a number of seal rings, which are arranged for sealing the hydraulic paths, is reduced so that a sliding load caused by the seal rings is reduced. As a result, the efficiency of the transmission is improved.

A shift mechanism establishing proper six gear ratios is achieved, and the mechanism is compact and able to achieve the aforementioned effects.

The second clutch and the first and third clutches, which have different torque transmission capacity, are arranged together adjacent to the reduction planetary gear. The frictional member, of the second clutch can have a reduced diameter because of the small torque transmission capacity, when the second clutch is arranged in the radial inner position of the frictional member of another clutch.

Therefore, the arrangement space is reduced and the whole shift mechanism is compact.

The input side member of the second clutch is common with the input member connected to the reduction planetary gear so that a number of power transmission members which radially cross in the shift mechanism is reduced. Therefore, the axial size of the shift mechanism is reduced.

The clutch drum, which is the output side member, of the second clutch is connected to the intermediate shaft, and the clutch hub, which is the input side member, is positioned on the reduction planetary gear side. Therefore, the structure for inputting the non-decelerated rotation to the clutch hub is simplified.

The input side member of the second clutch is the clutch hub, and the hub is common with the input element of the reduction planetary gear. Therefore, the arrangement space for the second clutch is reduced. As a result, the shift mechanism is compact.

BRIEF DESCRIPTION OF THE DRAWINGS

The invention will be described in conjunction with the following drawings in which like features are designated with like reference characters, and wherein:

FIG. 3 is a table showing the operation of the gear train, the established gear ratios and the gear ratio steps;

FIG. 20 is an axial cross sectional diagram illustrating the fifteenth embodiment in which the shift mechanism portion is further changed.

DETAILED DESCRIPTION OF PREFERRED EMBODIMENTS

Figure 1:
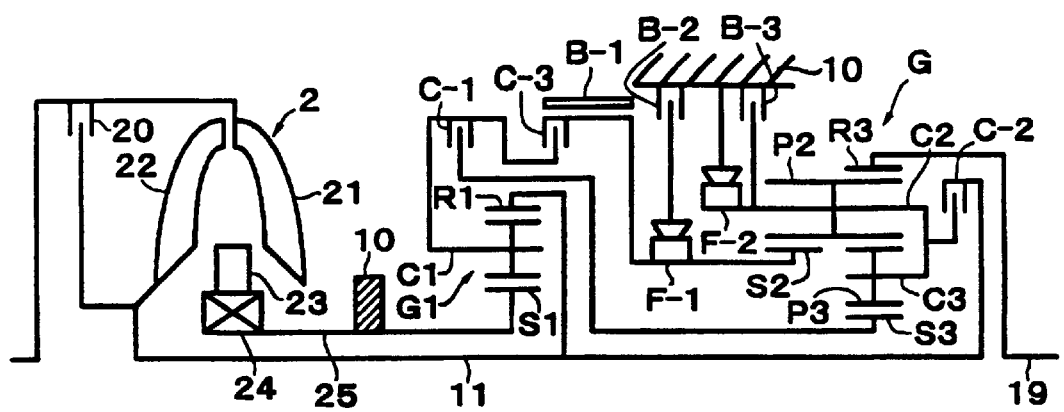
FIG. 1 is a schematic diagram illustrating a gear train of the first embodiment of an automatic transmission applied the invention.

The invention will become more apparent from detailed description of preferred embodiments with reference to the accompanying drawings. FIG. 1 illustrates a gear train of the first embodiment of the automatic transmission for a vehicle incorporating the invention with a schematic diagram. This transmission is a parallel type transmission for a front engine/rear drive (FR) vehicle, and establishes multiple gear stages with a reduction planetary gear G1, three clutches C-1, C-2, C-3, including two clutches C-1, C-3, which transmit a decelerated rotation transmitted through the reduction planetary gear G1, and a planetary gear set G inputted the decelerated rotation transmitted through the first clutch C-1 and the third clutch C-3.

In the planetary gear set, a first element S3 is connected to the output side member of the first clutch C-1, a second element S2 is connected to the output side member of the third clutch C-3 and is able to be engaged with a transmission case 10 through a first engaging member (B-1, F-1, B-2), a third element C2 (C3) is connected to the output side member of the second clutch C-2 inputted a non-decelerated rotation and is able to be engaged with the transmission case 10 through a second engaging member (3-3, F-2), and a fourth element R3 (R2) is connected to an output shaft 19 as an output member. In this automatic transmission having the structure of the gear train, each clutch and engaging member is selectively engaged/disengaged by applying/draining a hydraulic pressure to/from the each hydraulic servo of the clutches and engaging member by a hydraulic control system which is not shown in the figure so that gear ratios having six forward speeds and one reverse speed are established.

The gear train of this embodiment will be described in further detail as follows. With reference to FIG. 1, in this automatic transmission, a torque converter 2 having a lock-up clutch 20 and connected to an engine, not shown in the figure, is arranged in the mostly front position, and the shift mechanism is arranged in the rear position. The torque converter 2 comprises a pump impeller 21, turbine runner 22, a stator 23 arranged between them, a one-way clutch 24 engaging the stator 23 with the transmission case in the one-way direction, and a stator shaft 25 fixing the inner race of the one-way clutch to the transmission case 10.

The planetary gear set G structuring the main part of the shift mechanism is a ravegneaux type gear set comprising a small sun gear S3 as the first element having a small diameter, a large sun gear S2 as the second element having a large diameter, carriers C2, C3, integrated with each other as the third element supporting a pair of pinions P2, P3. The pinions P2, P3, are engaged with each other, the pinion P2 is a long pinion engaged with the large sun gear S2 and a ring gear R3 (R2), and the pinion P3 is a short pinion engaged with the small sun gear S3. It should be noted that the ring gear R3 (R2) and the carriers C2, C3, are theoretically structured from two different elements individually, however, the ring gear is actually one element, and the carrier is one element because the carriers are integrated with each other. Therefore, in the description, regarding the ring gear, according to the positional relationship with the sun gears S2, S3, a notation R2 is put in case the ring gear is arranged in the radial outer position of the sun gear S2, and a notation R3 is put in case the ring gear is arranged in the radial outer position of the sun gear S3. Further, regarding the carrier, one of the notations is omitted.

The reduction planetary gear G1 is structured from a simple planetary gear. A ring gear R1 as the input element is connected to an input shaft 1 connected to the turbine runner of the torque converter, a carrier C1 as the output element is connected to the input side member of the first clutch C-1 and connected through the input side member to the input side member of the third clutch C-3, and a sun gear S1 acting as a reaction element is fixed to the transmission case 10.

Figure 2:
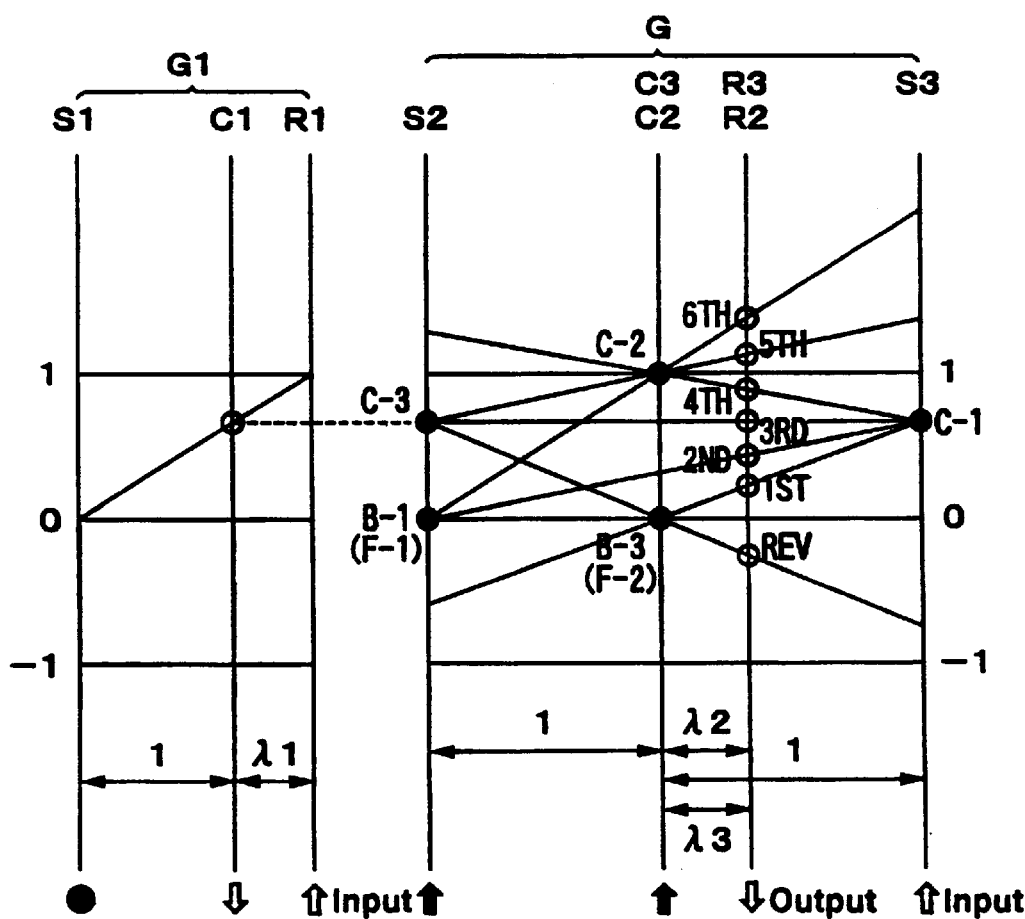
FIG. 2 is a velocity diagram for the gear train.

The automatic transmission thus structured shifts according to a vehicle load within gear stages corresponding to a shift range selected by a driver, by an electronic control system, and a hydraulic control system which are not shown in the figure. FIG. 3 shows the gear stages, which are established by engagement and disengagement of each clutch and brake, with a table. In this table, a symbol ○ denotes member engagement, a blank denotes member disengagement, a symbol Δ denotes member engagement which is performed only in case an engine brake is established, and a symbol ● denotes member engagement which is not directly operated for establishing the gear stages. FIG. 2 shows the gear stages, which are established by engagement and disengagement of each clutch and brake, and a relationship with the rotational ratio of each shift element in each gear stage with a velocity diagram. In this diagram, a symbol ● denotes member engagement.

As shown in FIG. 2 and FIG. 3, a first speed (1ST) is established by engagement of the first clutch C-1 and the brake B-3. It should be noted that, in this embodiment, as shown in the operational table, the automatic engagement of the one-way clutch F-2 is used instead of engagement of the brake B-3. A reason for using this engagement and a reason that this engagement is equivalent to engagement of the brake B-3 will be described later. In this gear stage, the decelerated rotation, which is decelerated from the rotation of the input shaft 11 shown in FIG. 1 through the reduction planetary gear G1, is inputted to the small sun gear S3 through the first clutch C-1, the carrier C3, which is engaged with the transmission case 10 by engagement of the one-way clutch F-2, acts as a reaction element, and the decelerated rotation of the ring gear R3 having the largest reduction ratio is outputted to the output shaft 19.

Next, a second speed (2ND) is established by engagement of the clutch C-1, and engagements of the one-way clutch F-1 and the brake B-2, which is engaged for validating the engagement of the one-way clutch F-1, which are equivalent to engagement of the brake B-1. It should be noted that the reason that the engagements of the one-way clutch F-1 and the brake B-2 are equivalent to the engagement of the brake B-1 will be mentioned later. In this gear stage, the decelerated rotation, which is decelerated from the rotation of the input shaft 11 through the reduction planetary gear G1, is inputted to the small sun gear S3 through the first clutch C-1, the large sun gear 52, which is engaged with the transmission case 10 by engagements of the brake B-2 and the one-way clutch F-1, acts as a reaction element, and the decelerated rotation of the ring gear R3 is outputted to the output shaft 19. The reduction ratio in this case is less than the reduction ratio in the first speed (1ST) an shown in FIG. 2.

Further, a third speed (3RD) is established by concurrent engagements of the first clutch C-1 and the third clutch C-3. In this case, the decelerated rotation, which is decelerated from the rotation of the input shaft 11 through the reduction planetary gear G1, is concurrently inputted to the large sun gear S2 and the small sun gear S3 through the first clutch C-1 and the third clutch C-3 individually so that the planetary gear set G is in the directly connected state, the rotation of the ring gear R3, which is the same as the input rotation inputted to both sun gears, is outputted to the output shaft 19 as the rotation decelerated from the rotation of the input shaft 11.

Further, a fourth speed (4TH) is established by concurrent engagements of the first clutch C-1 and the second clutch C-2. In this case, the decelerated rotation, which is decelerated from, the rotation of the input shaft 11 through the reduction planetary gear G1, is inputted to the small sun gear S3 through the first clutch C-1 on one side, the rotation, which is not reduced and inputted from the input shaft 11 through the second clutch C-2, is inputted to the carrier C3 on the other side, and the middle rotation between the two input rotations, which is the rotation of the ring gear R3 barely decelerated from the rotation of the input shaft 11, is outputted to the output shaft 19.

Next, a fifth speed (5TH) is established by concurrent engagements of the second clutch C-2 and the third clutch C-3. In this case, the decelerated rotation, which is decelerated from the rotation of the input shaft 11 through the reduction planetary gear G1, is inputted to the small sun gear S2 through the clutch C-3 on one side, the non-decelerated rotation, which is not reduced and inputted from the input shaft 11 through the second clutch C-2, is inputted to the carrier C2 on the other side, and the rotation, which is barely accelerated from the rotation of the input shaft 11, of the ring gear R3 is outputted to the output shaft 19.

Then, a sixth speed (6TH) is established by engagement of the second clutch C-2 and the brake B-1. In this case, the non-decelerated rotation from the input shaft 11 is inputted to only the carrier C2 through the second clutch C-2, the sun gear S2, which is engaged with the transmission case 10 by engagement of the brake B-1, acts as a reaction element, and the rotation of the ring gear R3, which is further accelerated, is outputted to the output shaft 19.

A reverse speed (REV) is established by engagements of the third clutch C-3 and the brake B-3. In this case, the decelerated rotation, which is decelerated from the rotation of the input shaft 11 through the reduction planetary gear G1, is inputted to the sun gear S2 through the third clutch C-3, the carrier C2, which is engaged with the transmission case 10 by engagement of the brake B-3, acts as a reaction element, and the rotation of the ring gear R3, which is a reverse rotation, is outputted to the output shaft 19.

As shown with the clearance in the up/down direction between symbols ○ which show the speed ratios of the ring gear R3, R2 on the velocity diagram in FIG. 2, each gear stage thus established has a proper speed step having a relatively equivalent interval to each gear stage. This relationship is shown with gear ratios and steps between gear ratios in FIG. 3 by specifically setting values and quantitatively showing. The gear ratio in this case is a value where a teeth number ratio λ1 between the sun gear S1 and the ring gear R1 of the reduction planetary gear G1 equals 0.556, a teeth number ratio λ2 between the large sun gear S2 and the ring gear R3 of the planetary gear set G equals 0.458, and a teeth number ratio X3 between the small sun gear S3 and the ring gear R3 equals 0.375, the width of the gear ratios equals 6.049.

Here, the relationship between the one-way clutch F-2 and the brake B-3 and the relationship between the one-way clutch F-1 and both brakes (B-1, B-2) mentioned above will be described. As shown in the relationship of engagement/ disengagement of both brakes (B-1, B-2) in the first speed and the second speed, one of these brakes is disengaged and the other brake is engaged concurrently in the up/down shift between these gear stages. That is, these brakes are frictional engagement elements which change states with one another during the shift between gear stages. In the changing states of the frictional engagement elements, a precise concurrent control for the engagement pressure and the disengagement pressure of the hydraulic servos which control the brakes is needed. For performing the control, the addition of control valves and a complicated hydraulic circuit are needed. In this embodiment, the engagement direction of the one-way clutch F-2 is set to be the same as the supporting direction for the reaction torque in the first speed, then the one-way clutch F-2 operates to perform the same function as the engagement of the brake B-3, by using the effects of the reaction torque received by the carrier C2 which is reversed between the first speed and the second speed. That is, in the first speed, the carrier C2 is engaged by the one-way clutch F-2 instead of the brake B-3. It should be noted that, in an engine coasting state in which the wheels drive the engine, the engagement of the brake B-3 is needed, as shown with the symbol A in FIG. 3, for achieving an engine brake because the direction of the reaction force received by the carrier C2 is reversed from the case of an engine drive state. Therefore, it is possible that the first speed is established by engagement of the brake B-3 without arranging the one-way clutch F-2 for establishing the gear stage.

The relationship between the one-way clutch F-1 and the brake B-1 for engagement of the sun gear S2 is the same as the relationship between the one way clutch F-2 and the brake B-3 for engagement of the carrier C2. In this case, the engagement direction of the one-way clutch F-1 is set as the same direction in which the sun gear S2 supports the reaction torque in the second speed so that the one-way clutch F-1 performs substantially an equivalent function with the engagement of the brake B-1. The function of the sun gear S2 is different from the function of the carrier C2 (C3). That is, the sun gear S2 is engaged with the case 10 for achieving the engine brake in the second speed and for establishing the sixth speed. Therefore, the brake B-1 is needed. Further, as shown in the velocity diagram in FIG. 2, the sun gear S2 rotates in reverse direction from the direction of the input rotation in the first speed, but rotates in same direction with the direction of the input rotation in the gear stages higher than the third speed. Therefore, the one-way clutch F-1 is not able to be directly connected to a stationary member. Therefore, the one-way clutch F-1 and the brake B-2 are arranged in series so that the engagement state of the one-way clutch F-1 is effectively operated.

Figure 4:
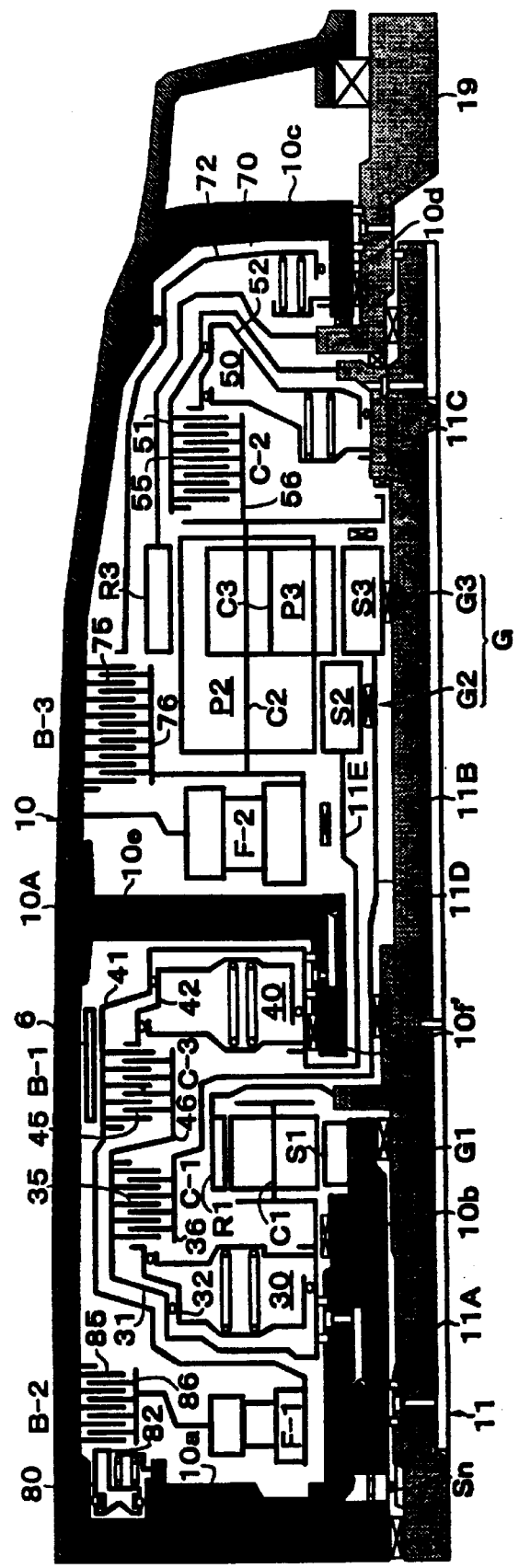
FIG. 4 is an axial cross sectional diagram illustrating a shift mechanism portion of the gear train.

Next, FIG. 4 illustrates the shift mechanism portion of the aforementioned gear train in further detail with a cross sectional view. Each structural element, which has been described before with reference to the schematic diagram, is designated by the same reference numeral or notation and the description is omitted. Detail portions, which are not able to be shown in the schematic diagram, will be described as follows. It should be noted that, through the specification, the term clutch is a generic name of a frictional member, a drum and a hub which are a support member and a power transmission member, and a hydraulic servo for operating the frictional member to engage and disengage. Further, as regarding brake, in the case where the brake is a multi-disc type the same as a clutch, the term brake is a generic name of a frictional member, a hub as a support member and a power transmission member, and a hydraulic servo for operating the frictional member to engage. In case the brake is structured from a band brake, the term brake is a generic name of a brake band, a drum forming an engagement surface and a hydraulic servo for engaging the brake band.

The transmission case 10 has a cylindrical shape. The transmission case 10 has a cylindrical boss portion 10*b* extended from a front end wall portion 10*a* to the inner side of the transmission case 10 and a cylindrical boss portion 10*d* extended from a rear end wall portion 10*c* to the inner side of the transmission case 10. A support wall 10A is fixed to the axial middle portion of the transmission case 10. The support wall 10A comprises a radial wall portion 10*e* connected to the transmission case 10 and a front cylindrical portion 10*f'* axially extended from the inner portion of the radial wall portion 10*e* to the front side. It should be noted that a notation Sn shows an input rotation sensor detecting an input rotation of the shift mechanism for a shift control.

Next, the input shaft 11, which inputs a power transmitted through the torque converter to the shift mechanism, is divided into a front portion 11A and a rear portion 11B for an accommodation for processing, and the two shafts are integrally connected with each other by closely engaging with a spline engagement. The front portion 11A of the input shaft 11 is connected to the turbine runner 22 of the torque converter 2, in the transmission case 10, the front end portion of the front portion 11A is supported through a bearing on the inner surface of the front end wall portion 10*a*, and the rear end portion of the front portion 11A is supported through a bearing on the inner surface of the head portion of the cylindrical boss portion 10*b*. That is, the front portion 11A is rotatably supported by the transmission case 10. The rear end portion of the rear portion 11B is inserted and supported through a bearing in a trough portion of the output shaft 19, and rotatably supported through the output shaft 19 on the inner surface of the cylindrical boss portion 10*d* of the transmission case 10. An input member inputting a rotation to the reduction planetary gear G1 is a flange formed on the portion closed to the rear end portion of the front portion 11A, and the flange is connected to the ring gear R1. Further, a flange is formed on a sleeve member 11C which is stationary fixed on the portion closed to the rear end portion of the rear portion 11B and forms the inner portion of the hydraulic servo 50 of the second clutch C-2. The flange is connected to the second clutch by fixing a clutch drum 51 to the flange.

Next, the output shaft 19 is rotatably supported through a bearing on the inner surface of the cylindrical boss portion 10*d* of the transmission case at the front end portion and through a bearing by an extension housing fixed to the hindmost portion of the transmission case 10 at the rear end portion. A connecting portion to the ring gear R3 of the planetary gear set G is a flange formed on the head of the output shaft 19, and a member, which is shaped as a drum and connected to the flange, is connected to the ring gear R3.

The planetary gear set G is arranged on the axial middle portion of the rear portion 11B of the input shaft, the small sun gear S3 is rotatably supported on the rear half portion 11B, further, the large sun gear S2 is rotatably supported on the sun gear S3. The carriers C2, C3, supporting the long pinion P2 and the short pinion P3 are integrated. The front end portion of the carriers is rotatably supported on a shaft portion 11E extended from the sun gear S2 to the front side, and the rear end portion of the carriers is rotatably supported on the rear portion 11B. in this planetary gear set G, a diameter of a first planetary gear G2 side of the planetary gear set G is different from a diameter of a third planetary gear G3 side having the ring gear R3 because no ring gear is arranged in the radial outer position of the first planetary gear G2 side.

The reduction planetary gear G1 is arranged on the outer surface of the end portion of the cylindrical boss portion 10b of the transmission case. The sun gear S1 as the stationary element is fixed on the cylindrical boss portion 10b with a spline engagement. The carrier C1 forming the output element of the reduction planetary gear G1 is supported through a bearing on the cylindrical boss portion 10b at one side.

According to the invention, the reduction planetary gear G1 and the first and third clutches C-1, C-3, which input the decelerated rotation transmitted through the reduction planetary gear G1 to the sun gear S3 of the planetary gear set G, are arranged on one side, that is, on the front side in the embodiment, of the planetary gear set G, and the third clutch C-3 is arranged closer to the planetary gear set G than the first clutch C1. A clutch drum 31 as an input side member of the first clutch C-1 is connected to the carrier C1 of the reduction planetary gear G1 and an input side member 46 of the third clutch C-3. A clutch hub 36 as an output side member of the first clutch C-1 is extended through the inner space of the third clutch and connected to the sun gear S3 of the planetary gear set G.

The first clutch C-1 includes a frictional member 35 comprising multi-disc type frictional elements and separator plates, the clutch drum 31 as the input side member transmitting a torque to the frictional member 35, the clutch hub 36 as the output side member outputting the torque transmitted by the engagement of the frictional member 35, and a hydraulic servo 30 for engaging the frictional member 35. The clutch drum 31 has cylindrical portions at inner and outer portions. A cylinder of the hydraulic servo 30 is structured between the inner side cylindrical portion and the outer side cylindrical portion having a small diameter so that the hydraulic servo 30 is supported. A large diameter cylindrical portion formed by expanding the outer side cylindrical portion is a support portion for the frictional member 35. The outer side of the separator plates are supported on the inner surface of the large diameter cylindrical portion of the clutch drum 31 with a spline engagement, and the inner side of the frictional elements are supported on the outer surface of the clutch hub 36 with a spline engagement. That is, the frictional member 35 is arranged between the clutch drum 31 and the clutch hub 36. The hydraulic servo 30 is structured from the inner side of the clutch drum 31 as the cylinder, a piston 32 axially slidably inserted in the cylinder, a cancel plate fixed on the inner portion of the clutch drum 31, and a return spring arranged between the piston 32 and the cancel plate.

In the first clutch C-1, the hydraulic servo 30 is arranged in the front side of the reduction planetary gear G1 and in the radial outer side of the cylindrical boss portion 10b, and the frictional member 35 is arranged in the radial outer side of the reduction planetary gear G1. The clutch drum 31 of the first clutch C-1 is arranged in order that the cylinder of the hydraulic servo 30 supported in the drum is opened to the reduction planetary gear G1 side. The inner cylindrical portion of the clutch drum 31 is connected to the carrier C1 of the reduction planetary gear G1. The clutch hub 36 is connected to a power transmission member 11D supported through a bearing on the front portion 11A of the input shaft, and connected through the power transmission member 11D to the sun gear S3 of the planetary gear set G.

The third clutch C-3 includes a frictional member 45 comprising multi-disc type frictional elements and separator plates, the clutch hub 46 as the input side member transmitting a torque to the frictional member 45, the clutch drum 41 as the output side member outputting the torque transmitted by the engagement of the frictional member 45, and a hydraulic servo 40 for engaging the frictional member 45. The clutch drum 41 has cylindrical portions at inner and outer portions. A cylinder of the hydraulic servo 40 is provided between the inner side cylindrical portion and the outer side cylindrical portion having a small diameter so that the hydraulic servo 40 is supported. A large diameter cylindrical portion formed by expanding the outer side cylindrical portion is a support portion for the frictional member 45. The outer side of the separator plates are supported on the inner surface of the large diameter cylindrical portion of the clutch drum 41 with a spline engagement, and the inner side of the frictional elements are supported on the outer surface of the clutch hub 46 with a spline engagement. That is, the frictional member 45 is arranged between the clutch drum 41 as the clutch hub 46. The hydraulic servo 40 is structured from the inner side of the clutch drum 41 as the cylinder, a piston 42 axially slidably inserted in the cylinder, a cancel plate fixed on the inner portion of the clutch drum 41, and a return spring arranged between the piston 42 and the cancel plate.

In the third clutch C-3 thus structured, the hydraulic servo 40 of the third clutch C-3 is supported through a bearing on the outer surface of the front cylindrical portion 10f' of the support wall 10A on the rear side of the reduction planetary gear G1. The frictional member 45, which is arranged in the radial outer position of the reduction planetary gear G1, is aligned with the frictional member 35 of the first clutch C-1 and arranged on the rear side of the frictional member 35. The clutch drum 41 of the third clutch C-3 is arranged so that the cylinder of the hydraulic servo 40 supported in the drum is opened to the reduction planetary gear G1 side. The inner cylindrical portion of the clutch drum 41 is connected through the power transmission member 11E, which is inserted in a radial outer position of the power transmission member 11D, to the large sun gear S2. The clutch hub 46 is connected to the clutch drum 31 of the first clutch C-1.

The second clutch C-2 includes a frictional member 55 comprising multi-disc type frictional elements and separator plates, the clutch drum 51 as the input side member transmitting a torque to the frictional member 55, the clutch hub 56 as the output side member outputting the torque transmitted by the engagement of the frictional member 55, and a hydraulic servo 50 for engaging the frictional member 55. The clutch drum 51 has a cylindrical portion at the outer portion. A cylinder of the hydraulic servo 50 is provided between the sleeve member 11C and the outer side cylindrical portion having small diameter so that the hydraulic servo 50 is supported. A large diameter cylindrical portion formed by expanding the outer side cylindrical portion is a support portion for the frictional member 55. The outer side of the separator plates are supported on the inner surface of the large diameter cylindrical portion of the clutch drum 51 with a spline engagement, and the inner side of the frictional elements are supported on the outer surface of the clutch hub 56 with a spline engagement. That is, the frictional member 55 is arranged between the clutch drum 51 and the clutch hub 56. The hydraulic servo 50 is structured from the inner side of the clutch drum 51 as the cylinder, a piston 52 axially slidably inserted in the cylinder, a cancel plate fixed on the inner portion of the clutch drum 51, and a return spring arranged between the piston 52 and the cancel plate.

The hydraulic servo 50 of the second clutch C-2 is supported on the input shaft 11 on the rear side of the planetary gear set G. The frictional member 55 is arranged on the front side of the hydraulic servo 50. The clutch hub 56 is connected to the carrier C2 of the planetary gear set G.

The brake B-1 of the first engaging member is a band brake comprising the clutch drum 41 as a brake drum and a band 6 which is selectively engaged with the outer surface of the clutch drum 41 of the third clutch C-3. Generally, in case a brake is a band brake, a moment, which inclines the drum axis, is formed by the radial load in the engagement of the brake. In this embodiment, however, the brake drum is the clutch drum 41, which is supported on the front cylindrical portion 10f' of the support wall 10A, of the third clutch, that is, the drum is supported by the transmission case in the radial inner position of the band engagement portion so that loads formed in the brake engagement do not affect the other members. It should be noted that the hydraulic servo of the brake B-1 is omitted in the figures.

The inner race of the one-way clutch F-1 of the first engaging member is connected to the drum 41 of the third clutch C-3. The outer race is integrated with the hub 86 of the brake B-2. The one-way clutch F-1 is arranged on the front side of the first clutch C-1, that is, in the frontmost portion of the shift mechanism. The brake B-2, which engages the outer race with the transmission case 10, is a multi-disc type brake comprising a frictional member 85. The frictional member 85 is structured from frictional elements engaged with the hub 86 and separator plates engaged with an inner spline of the transmission case 10. The hydraulic servo 80 of the brake B-2 comprises the front end wall portion 10a of the transmission case 10 as a cylinder, a piston 82 axially slidably inserted in the cylinder, a retainer fixed to the front end wall portion 10a of the transmission case 10, and a return spring arranged between the retainer and the piston 82.

The brake B-3 of the second engaging member is a multi-disc type brake comprising a frictional member 75. The frictional member 75 comprises multiple frictional elements and separator plates. The separator plates are engaged with an inner spline of the transmission case 10. The frictional elements are engaged with the hub 76 fixed to the carrier C2. The frictional member 75 is arranged in the radial outer space, in which the ring gear is not arranged, of the first planetary gear G2 side of the planetary gear set G. The hydraulic servo 70 of the brake B-3 comprises the rear end wall portion 10c and the cylindrical boss portion 10d of the transmission case 10 as a cylinder, a piston 72 axially slidably inserted in the cylinder, a retainer fixed on the cylindrical boss portion 10d of the transmission case 10, and a return spring arranged between the retainer and the piston 72. The extension portion of the piston 72, extended along with the surrounding wall of the transmission case 10 to the rear end of the frictional member 75, is engaged with a spline of the surrounding wall of the transmission case 10.

The one-way clutch F-2 of the second engaging member is arranged in parallel with the brake B-3. The inner race is connected to the front end portion of the carrier C2. The outer race in engaged with the transmission case. The one-way clutch F-1 is arranged between the support wall 10A and the planetary gear set G.

Thus, in the first embodiment, a compact shift mechanism having proper six gear stages is obtained by inputting the decelerated rotation transmitted through the two clutches C-1, C-3, from the reduction planetary gear G1 to the two elements S3, S2, of the ravegneaux type planetary gear set G. The sun gear S1 of the reduction planetary gear G1 is fixed to the transmission case 10 so that a supporting member for fixing the sun gear S1 is not needed. Further, the hydraulic servo 30 of the first clutch C-1 is arranged on outer surface of the cylindrical boss portion 10b arranged in the front space of the reduction planetary gear G1, and the hydraulic servo 40 of the third clutch C-3 is arranged on outer surface of the front cylindrical portion 10f' arranged in the rear space of the reduction planetary gear G1. Therefore, the hydraulic paths for applying hydraulic pressures to the hydraulic servos of the both clutches are directly connected to the cylindrical boss portion 10b and the front cylindrical portion 10f' without going through other shafts. As a result, the hydraulic paths which have to be filled with oil are shortened so that the responsiveness to the applications of the hydraulic pressures are improved. Further, the hydraulic pressure is directly applied from the cylindrical portion 10f' of the support wall 10A to the hydraulic servo 40 of the third clutch C-3 without being transmitted through other rotational members. As a result, a number of seal rings for sealing the hydraulic path is reduced so that a sliding load formed by the seal rings is reduced. Further, the first engaging member is a band brake arranged in a space which is small in the radial direction. Therefore, the radial outer space of the third clutch C-3 is obtained by radially superposing the brake B-1 and the third clutch C-3. Then, the diameter of the clutch is increased in order to obtain the needed torque transmission capacity. As a result of the increase in the diameter of the clutch, the number of frictional members 45 needed is reduced, so that the axial size of the clutch is reduced.

Figure 5:
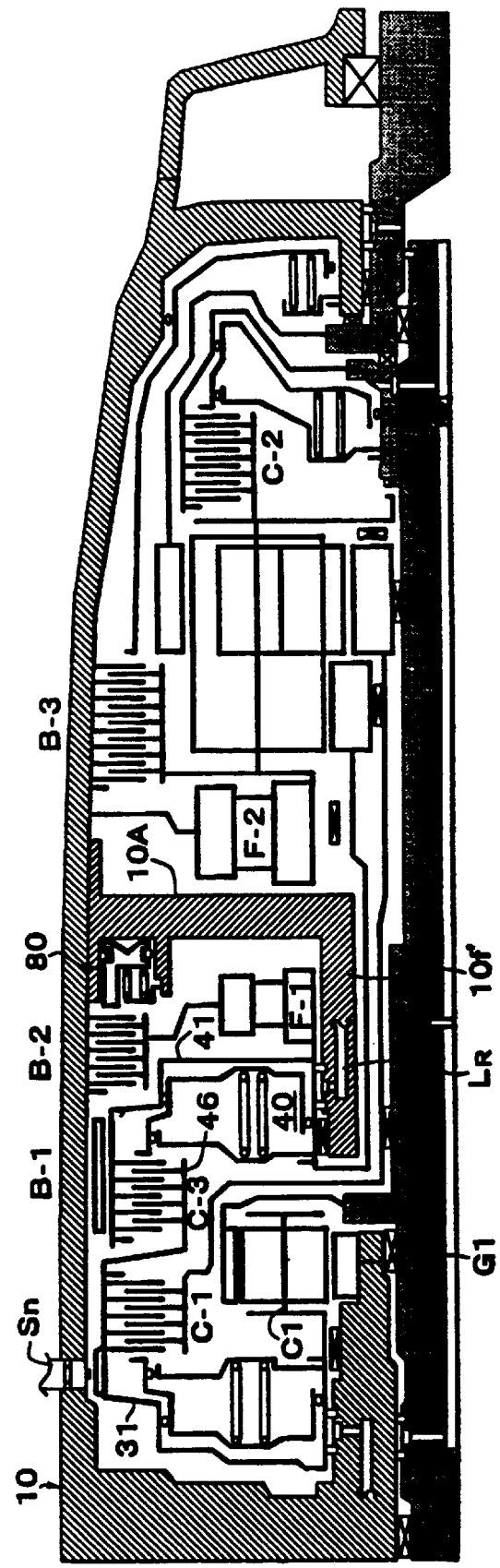
FIG. 5 is an axial cross sectional diagram illustrating the second embodiment in which the shift mechanism portion is changed.

In the first embodiment, the one-way clutch F-1 and the brake B-2 are arranged on the front side of the first clutch C-1, that is, in the frontmost position of the shift mechanism. However, these arrangement positions may be changed. FIG. 5 illustrates the automatic transmission of the second embodiment, in which the one-way clutch F-1 and the brake B-2 are arranged on the front side of the support wall 10A, that is, on the rear side of the third clutch C-3, with a sectional view. Only differences with the first embodiment in this embodiment will be described for preventing a duplication of the description.

In this second embodiment, as aforementioned, the arrangements of the one-way clutch F-1 and the brake B-2 are changed compared to the first embodiment. The hydraulic servo 80 of the brake B-2 is supported by the support wall 10A. In this embodiment, it is not necessary that the inner race of the one-way clutch F-1 be extended in the radial outer space of the first clutch C-1 for connecting to the drum 41 of the third clutch C-3. The inner race of the one-way clutch F-1 is directly connected to the radial inner portion of the drum 41 of the third clutch C-3. Therefore, no member is arranged in the radial outer space of the drum 31 of the first clutch C-1 transmitting the output rotation of the reduction planetary gear G1. As a result, it is possible to detect the input rotation by detecting the rotation of the drum 31 at the radial outer side of the drum 31. In this embodiment, an input rotation sensor Sn is arranged on the surrounding wall portion of the transmission case 10.

In this embodiment, the clutch hub 46 of the third clutch C-3 is connected through the clutch drum 31 of the first clutch C-1 to the carrier C1 of the reduction planetary gear G1 so that no member, which is arranged for transmitting the output rotation of the reduction planetary gear G1 to the first and third clutches, is arranged in the radial outer space of both clutches. Therefore, the diameters of the first and third clutches, which transmit the torque amplified at the reduction planetary gear G1, are able to be increased. As a result, it is easy to maintain the torque transmission capacity of the clutches according to the necessary transmission torque without increasing the axial sizes of the clutches. Therefore, the transmission is compact. Further, the clutch drum 31 of the first clutch, which always rotates, is arranged in the outermost radial position. Therefore, it is easy to detect the input rotation needed for the transmission control without arranging the sensor Sn in the deep portion of the transmission case 10. Further, the front end wall portion 10a is not needed to be thick for arranging the sensor Sn so that the axial size of the transmission is reduced. Further, the axial size of the transmission is increased by arranging the support wall 10A, however, no member is extended in the radial outer space of the first and third clutches C-1, C-3, so that the diameter of the clutches are able to be increased for obtaining the torque transmission capacity, then, the axial sizes of the clutches are reduced. That is, the increase of the axial size of the transmission is counterbalanced with the reduction of the axial size of the clutches. As a result, the increase of the axial size of the transmission is minimized.

Further, in this embodiment, the hydraulic servo 80 of the second brake B-2 is supported by the support wall 10A so that a member for supporting the hydraulic servo cylinder of the second brake B-2 is not needed. Therefore, an increase of a number of the structural members is prevented.

Figure 6:
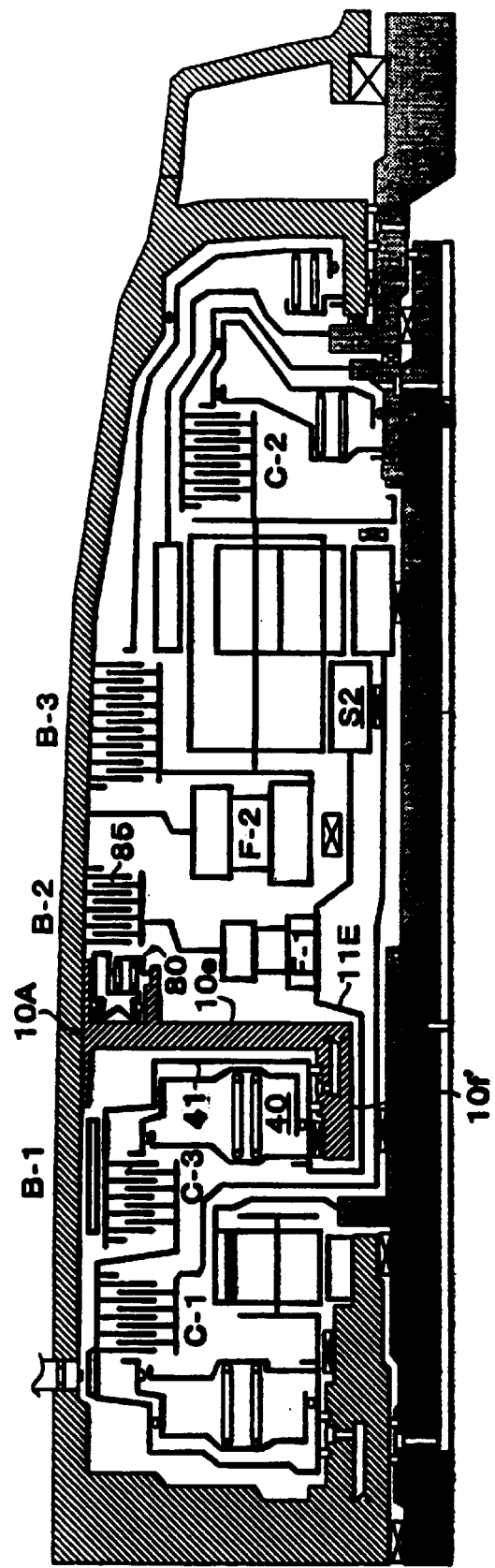
FIG. 6 is an axial cross sectional diagram illustrating the third embodiment in which the shift mechanism portion is further changed.

Next, FIG. 6 illustrates the third embodiment, in which the one-way clutch F-1 and the brake B-2 are arranged on the rear side of the support wall 10A, that is, on the front side of the second one-way clutch F-2, with a sectional view. In this third embodiment, the change points are the connecting portion of the one-way clutch F-1 and the opening direction of the hydraulic servo of the brake B-2. In this embodiment, the inner race of the one-way clutch F-1 is connected to the power transmission member 11E which connects the drum 41 of the third clutch C-3 to the sun gear S2 of the planetary gear set G. The hydraulic servo 80 of the brake B-2 is supported by the support wall 10A and faces the frictional member 85 arranged in the rear side of the hydraulic servo 80. Therefore, the one-way clutch F-1, the brake B-2 and the hydraulic servo are not arranged between the hydraulic servo 40 of the third clutch C-3 and the radial wall portion 10e so that the hydraulic path formed in the front cylindrical portion 10f′ is shortened.

Figure 7:
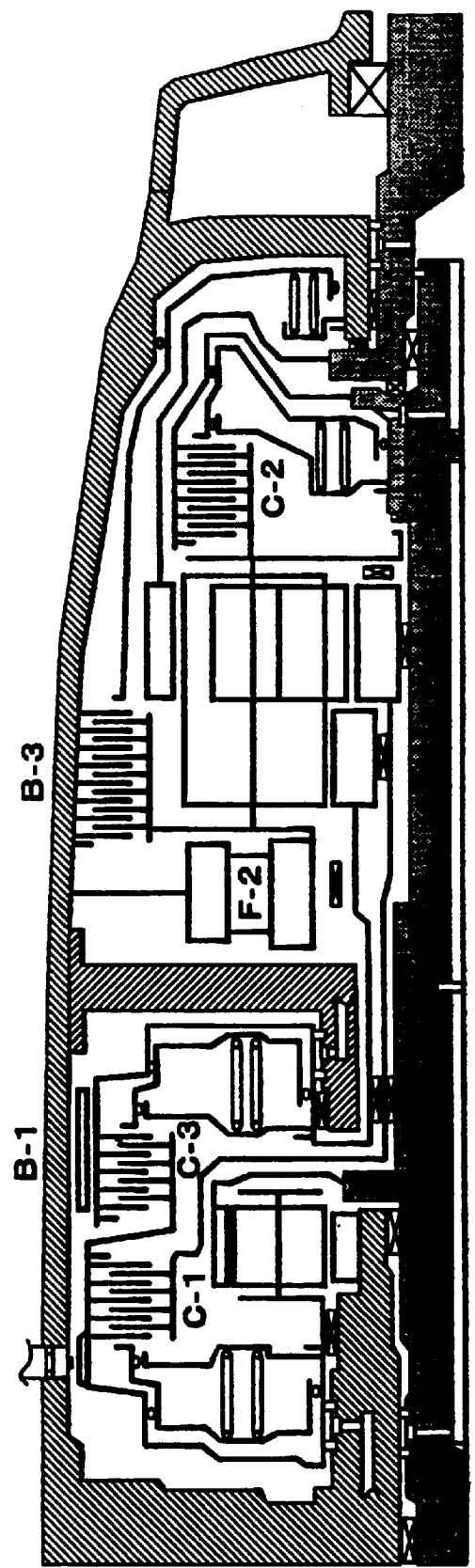
FIG. 7 is an axial cross sectional diagram illustrating the fourth embodiment in which the shift mechanism portion is further changed.

FIG. 7 illustrates the fourth embodiment which is different from the aforementioned embodiments and does not have the one-way clutch F-1 and the brake B-2. In this embodiment, regarding the engaging control of the brake B-1, the hydraulic servo control of the band brake as the brake B-1 is more difficult, however, the elimination of one-way clutch F-1 and brake B-2 is effective for reducing the axial size of the transmission.

Figure 8:
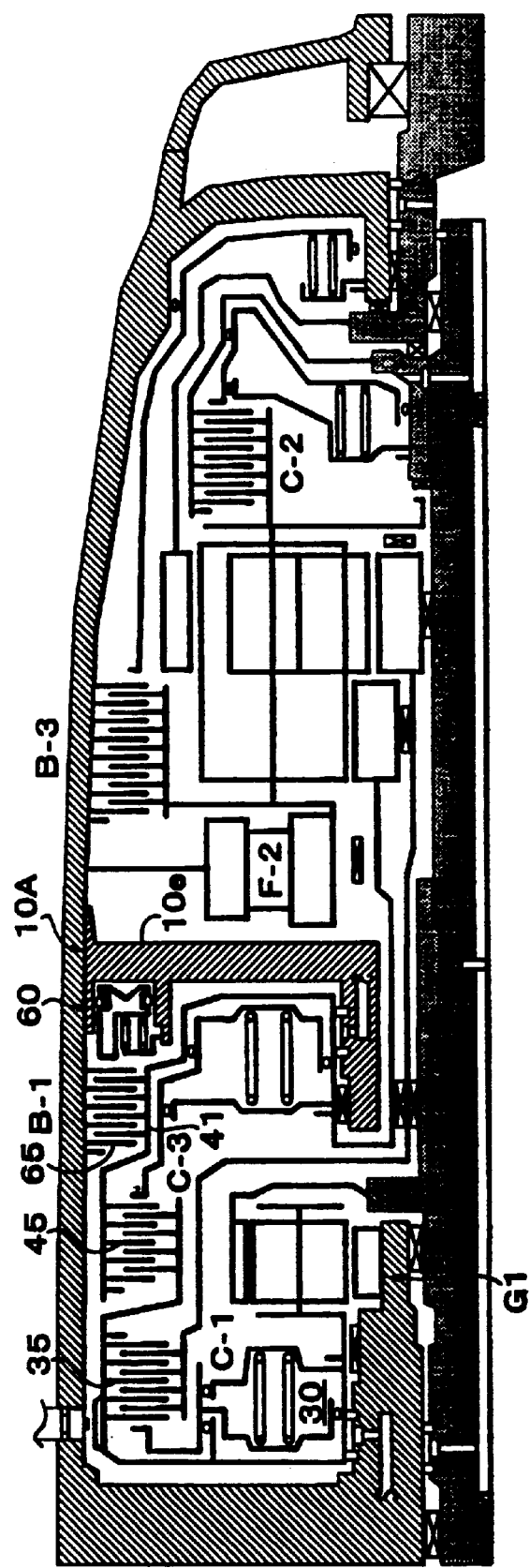
FIG. 8 is an axial cross sectional diagram illustrating the fifth embodiment in which the shift mechanism portion is further changed.

If the one-way clutch F-1 and the brake B-2 are not provided, it is preferable that the brake B-1 be a multi-disc type brake which is easier to control than a band brake. FIG. 8 illustrates the fifth embodiment in which the brake B-1 is changed to the multi-disc type. Other members are almost the same as in the fourth embodiment. In this embodiment, the frictional members 35, 45, of the first and third clutches C-1, C-3, and the frictional member 65 of the brake B-1 are axially aligned. Therefore, the frictional members 35, 45, of the first and third clutches C-1, C-3, are relatively moved to the front side so that the frictional member 35 of the first clutch C-1 is arranged in the radial outer position of the hydraulic servo 30 and the frictional member 45 of the third clutch C-3 is arranged in the radial outer position of the reduction planetary gear G1. The hydraulic servo 60 of the brake B-1 is supported by the radial wall portion 10e of the support wall 10A and faces the frictional member 65, that is, the front side. In this case, the separator plates of the frictional member 65 are engaged with the spline formed on the inner surface of the surrounding wall of the transmission case 10, and the frictional elements are supported on the drum 41 of the third clutch C-3 as the hub.

Figure 9:
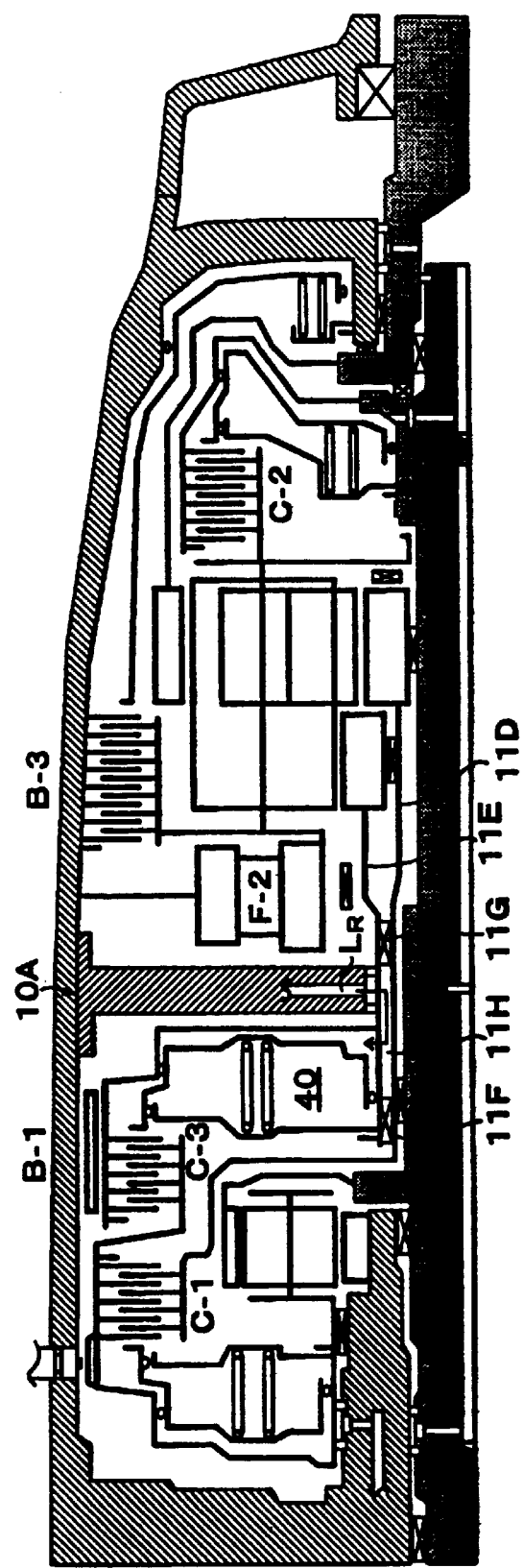
FIG. 9 is an axial cross sectional diagram illustrating the seventh embodiment in which the shift mechanism portion is further changed.

FIG. 9 illustrates the sixth embodiment in which the cylindrical portion of the support wall 10A is not provided. The arrangement of the remaining members is the same as in the fourth embodiment. In this embodiment, a hydraulic path $L_R$ for applying hydraulic pressure to the hydraulic servo 40 of the third clutch C-3 is connected through a space surrounded by the power transmission members 11D, 11E and bushes 11F, 11G, to the hydraulic servo 40. Then, a pair of seal rings, which are aligned on front and rear sides, are provided at the relative rotating portion between the support wall 10A and the power transmission member 11E for sealing. In this embodiment, the diameter of the hydraulic path connecting portion is reduced compared to the embodiments in which the cylindrical portion of the support wall 10A is provided so that the effect of the centrifugal force is reduced when the hydraulic pressure is applied to the hydraulic servo 40. As a result, the control performance of the third clutch is improved.

Figure 10:
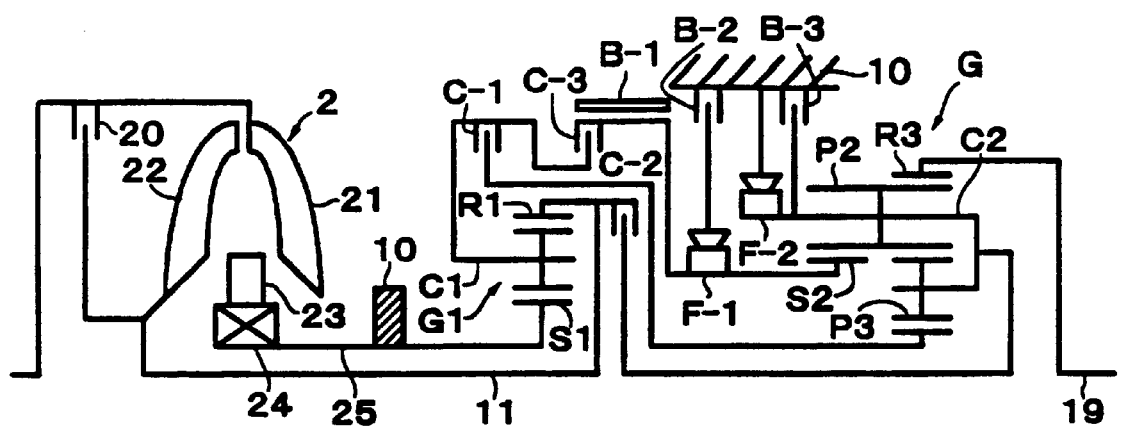
FIG. 10 is a schematic diagram illustrating the seventh embodiment in which the shift mechanism portion is further changed.
Figure 11:
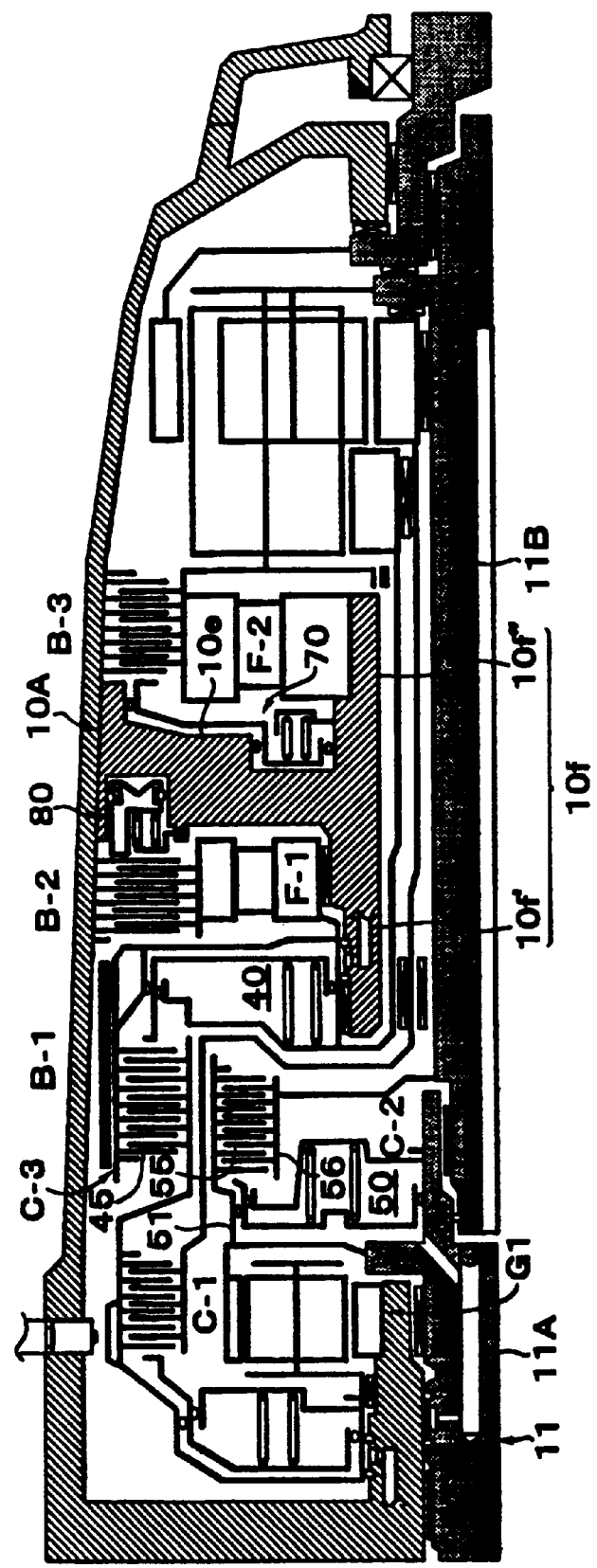
FIG. 11 is an axial cross sectional diagram illustrating the shift mechanism of the seventh embodiment.

In the aforementioned embodiments, the second clutch C-2 is arranged on the rear side of the planetary gear set G, however, the second clutch C-2 is able to be arranged in the rear side position of the reduction planetary gear G1 next to the third clutch C-3. FIG. 10 illustrates the seventh embodiment having this arrangement with a schematic diagram, and FIG. 11 illustrates a specific cross sectional structure. As illustrated in FIG. 10, in this embodiment, the arrangement of each element is the same as in the first embodiment except for the arrangement of the second clutch C-2. Therefore, the same notations or reference numerals are used and the descriptions are omitted.

In this embodiment, as illustrated in FIG. 11, the input shaft 11 is different. The majority of the input shaft 11 is an intermediate shaft transmitting the input rotation transmitted from the clutch C-2. A rear portion 11B as the intermediate shaft is relatively rotatable with a front portion 11A, and the front end of the rear portion 11B is supported through a bearing by the front portion 11A. The hydraulic servo 50 of the second clutch C-2, which is arranged in the rear position of the reduction planetary gear G1, is supported by the rear end portion of the front portion 11A of the input shaft and the clutch drum 51 is fixed on the rear end portion of the front portion 11A. The clutch hub 56 is connected to the front end of the rear portion 11B of the input shaft.

In this embodiment, the cylindrical portion 10f of the support wall 10A extends axially toward the front and back of the transmission case 10. The hydraulic servo 40 of the third clutch C-3 and the inner race of the one-way clutch F-1 are rotatably supported on the front cylindrical portion 10f′, and the inner race of the one-way clutch F-2 is fixed on the rear cylindrical portion 10f″. The hydraulic servo 80 of the brake B-2 and the hydraulic servo 70 of the brake B-3 are supported by the radial wall portion 10e of the support wall 10A back to back with each other. The frictional member 55, which has a small diameter because the torque transmission capacity of the second clutch C-2 transmitting the non-decelerated rotation is relatively small, and the frictional member 45 of the third clutch C-3, of which the torque capacity is maintained by increasing the diameter, are radially superposed so that the axial size of the transmission is appreciably reduced.

In this embodiment, the clutch drum 51 of the second clutch C-2 is integral with a power transmission member connected to the reduction planetary gear G1. Therefore, a number of power transmission members are radially superposed in the shift mechanism so that the axial size of the shift mechanism is reduced.

Figure 12:
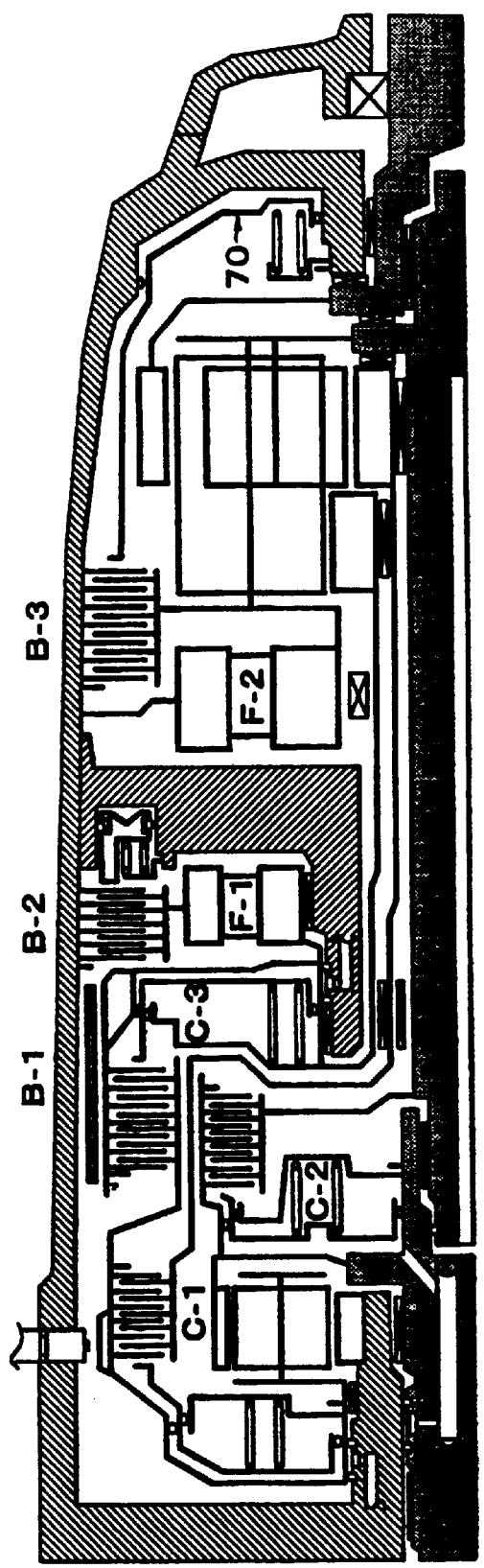
FIG. 12 is an axial cross sectional diagram illustrating the eighth embodiment in which the shift mechanism portion is further changed.

FIG. 12 illustrates the eighth embodiment in which the hydraulic servo 70 of the brake B-3 is arranged in the rearmost position of the shift mechanism as provided in the first through sixth embodiments. The arrangement of the remaining members is the same as in the seventh embodiment.

Figure 13:
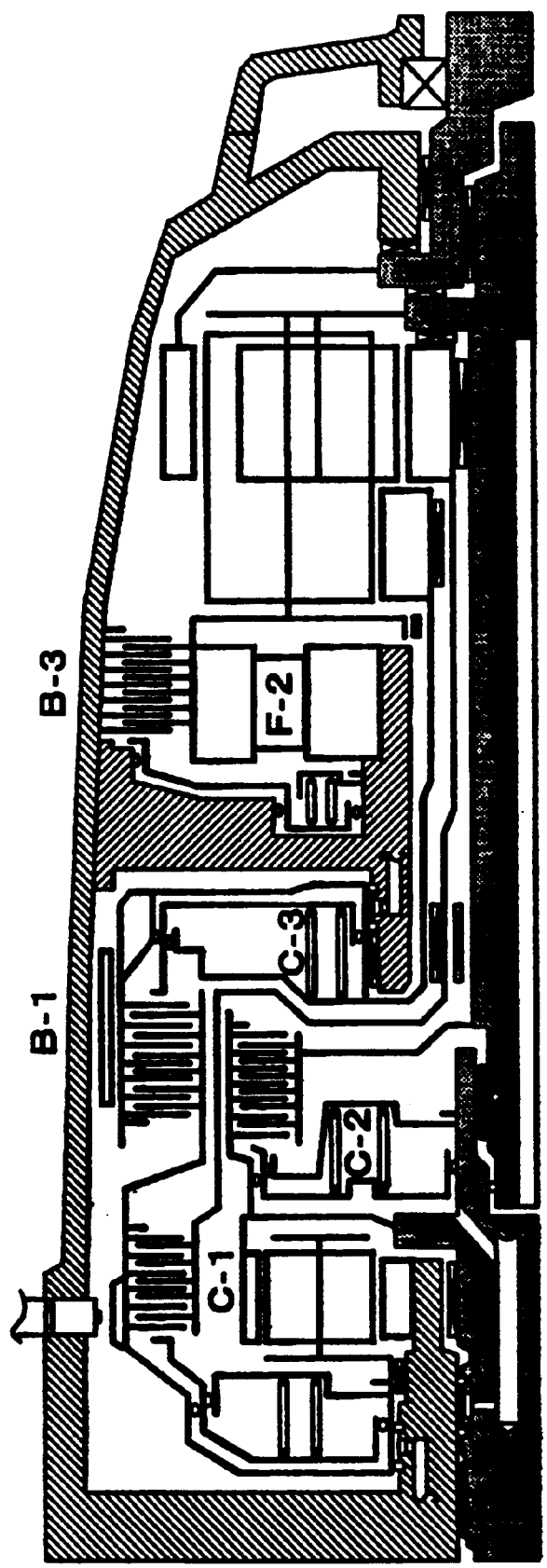
FIG. 13 is an axial cross sectional diagram illustrating the ninth embodiment in which the shift mechanism portion is further changed.

FIG. 13 illustrates the arrangement of the ninth embodiment which does not have the one-way clutch F-1 and the brake B-2. The arrangement of the remaining members is the same as in the eighth embodiment. As compared with the eighth embodiment illustrated in FIG. 12, with the same contraction ratio, the axial size of the transmission is extremely reduced.

Figure 14:
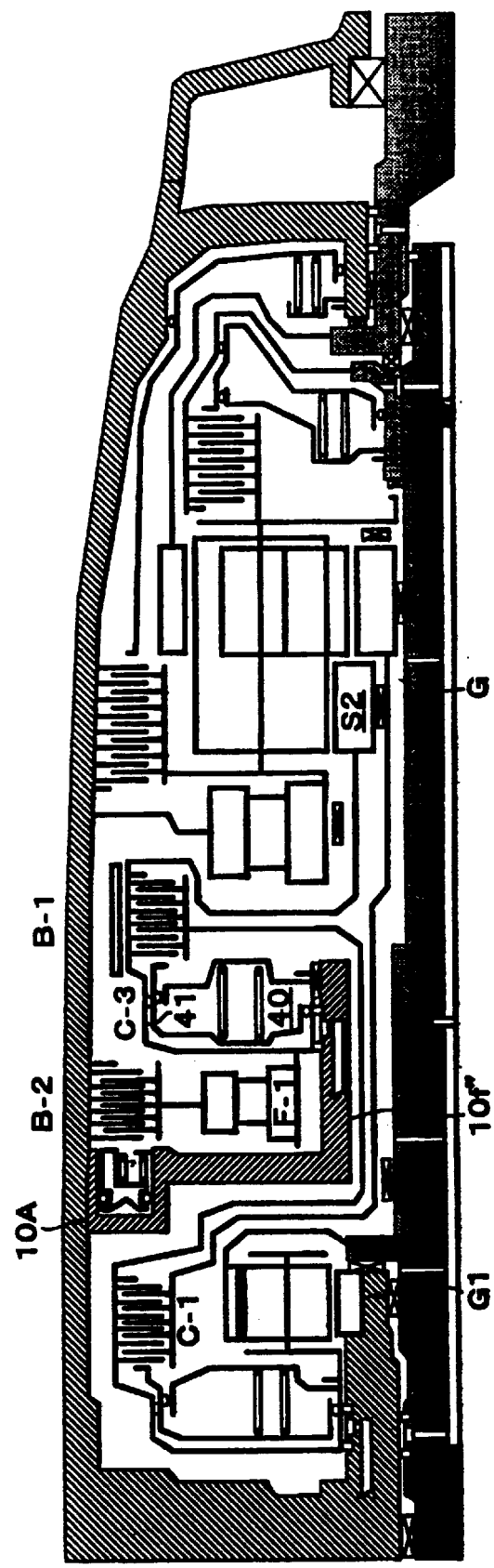
FIG. 14 is an axial cross sectional diagram illustrating the tenth embodiment in which the shift mechanism portion is further changed.

FIG. 14 illustrates the tenth embodiment in which the arrangement order of the first and third clutches C-1, C-3, and the reduction planetary gear G1 is the same as in the first embodiment and the one-way clutch F-1 and the brake B-2 are arranged between the reduction planetary gear G1 and the third clutch C-3. In this embodiment, the cylinder of the hydraulic servo 40 of the third clutch C-3 is supported by the clutch drum 41 forming the output side member of the third clutch. The cylinder faces the rear side of the support wall 10A. The clutch drum 41 is connected to the sun gear S2 of the planetary gear set G. In detail, the support wall 10A comprises the cylindrical portion 10f" axially extended to the rear side, and the hydraulic servo 40 supported by the clutch drum 41 of the third clutch C-3 is supported on the outer surface of the cylindrical portion 10f'''. Effects and losses of this arrangement are same with the effects and losses of the second embodiment against the first embodiment. Further, the clutch drum 41 of the third clutch C-3 functions as the brake drum of the first brake B-1 and is supported by the hydraulic servo 40 and the sun gear S2 at both sides so that the brake drum is prevented from waggling during the brake engagement.

Figure 15:
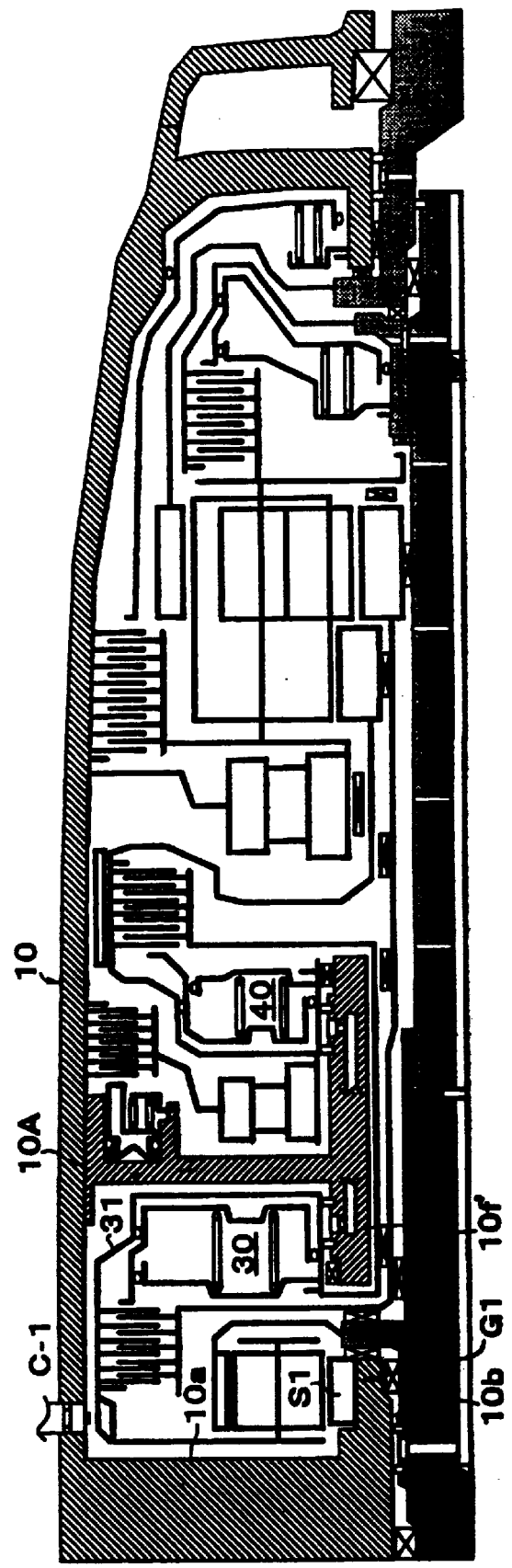
FIG. 15 is an axial cross sectional diagram illustrating the eleventh embodiment in which the shift mechanism portion is further changed.

FIG. 15 illustrates the eleventh embodiment in which the positional relationship between the first clutch C-1 and the reduction planetary gear G1 is opposite from the aforementioned tenth embodiment and, according to that, the direction of the first clutch C-1 is reversed. In this embodiment, the reduction planetary gear G1 is arranged on the boss portion 10b extended from the front end wall portion of the transmission case 10, and the sun gear S1 is fixed on the boss portion 10b. The clutch drum 31 supporting the hydraulic servo 30 of the first clutch C-1 is supported on the front cylindrical portion 10f' axially extended from the support wall 10A to the front side. The effects of this arrangement, which are substantially different from the aforementioned embodiments, is that it is not necessary to form the hydraulic path for applying the hydraulic pressure to the hydraulic servo 30 in the front end wall portion 10a, which is formed by the oil pump body and in which hydraulic paths are difficult to form, of the transmission case because the front end wall portion 10a is exclusively used for supporting the reduction planetary gear G1. Further, the hydraulic pressures are applied to the hydraulic servos 30, 40, of the first and third clutches from the support wall 10A which is arranged between the clutches. Therefore, the hydraulic paths to the hydraulic servos of both clutches are shortened, and the lengths are approximately same. As a result, the responsiveness of the each clutch is improved and the control characteristics of the both clutches are accommodated.

Figure 16:
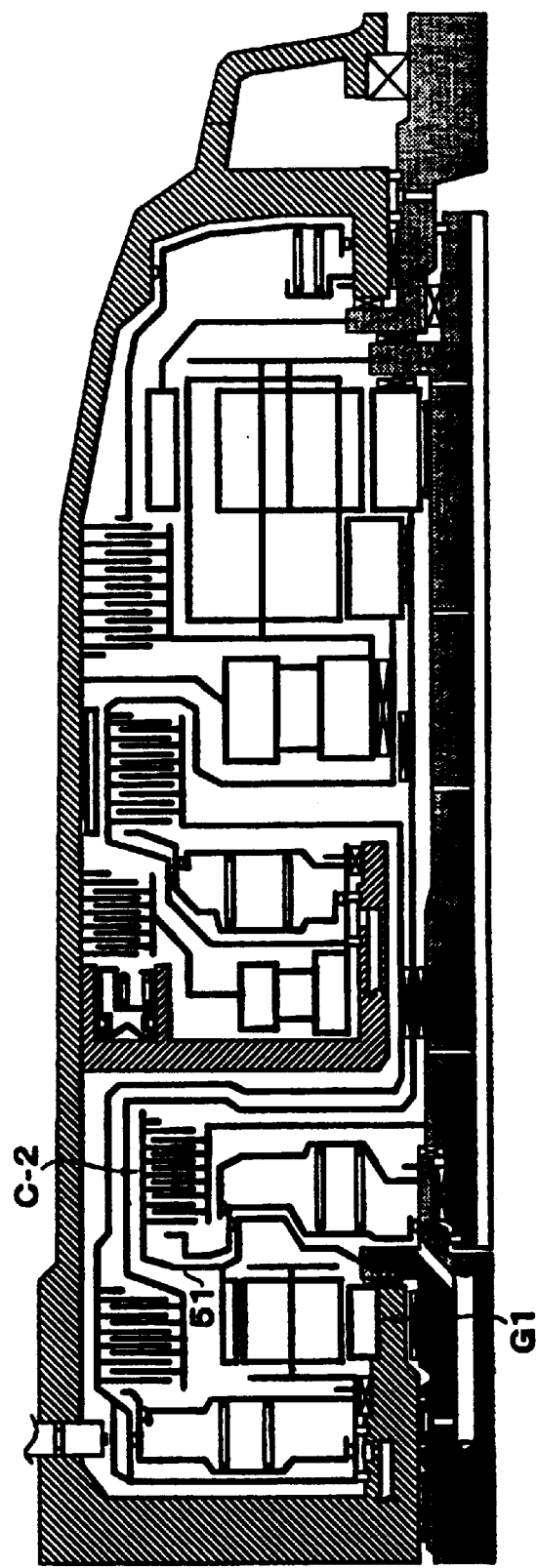
FIG. 16 is an axial cross sectional diagram illustrating the twelfth embodiment in which the shift mechanism portion is further changed.

FIG. 16 illustrates the twelfth embodiment in which the second clutch C-2 is arranged behind the reduction planetary gear G1. The arrangement of the remaining members is the same as in the tenth embodiment. In this embodiment, as in the seventh embodiment, the clutch drum 51 of the second clutch C-2 is integral with the connecting member connected to the reduction planetary gear G1.

Figure 17:
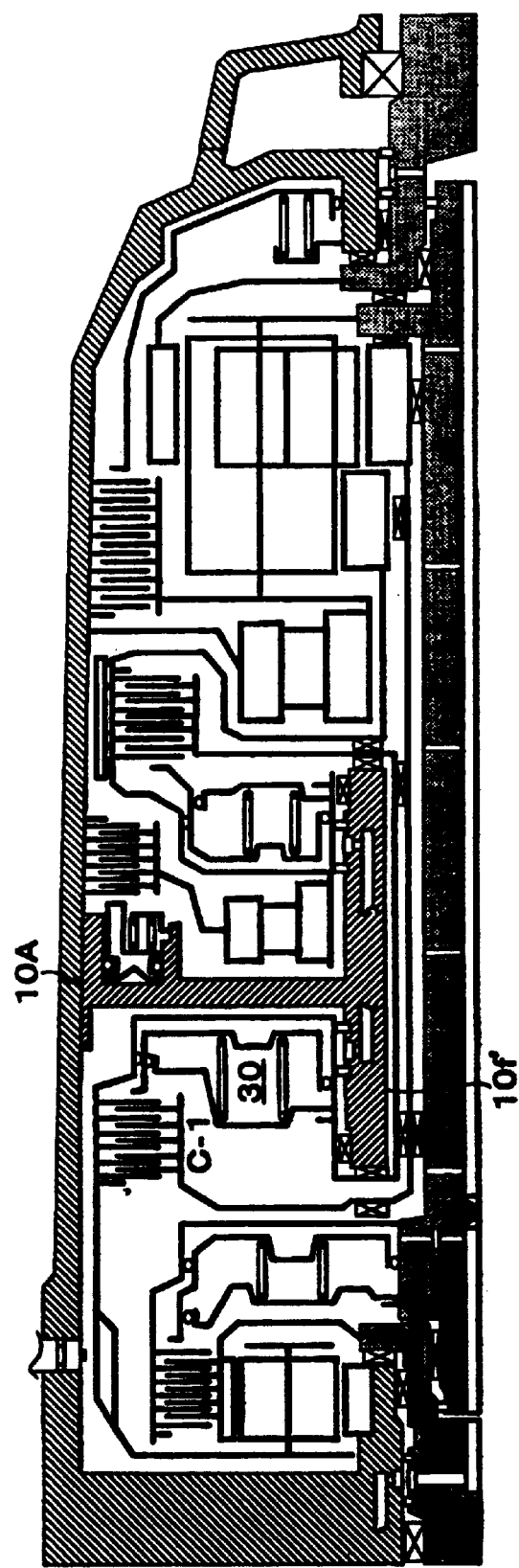
FIG. 17 is an axial cross sectional diagram illustrating the thirteenth embodiment in which the shift mechanism portion is further changed.

FIG. 17 illustrates the thirteenth embodiment in which the position of the first clutch is changed from the twelfth embodiment. In this case, the first clutch C-1 is moved to the support wall 10A side, and the hydraulic servo 30 is supported on the cylindrical portion 10f'. The effects of this arrangement are the same as the effects of the eleventh embodiment.

The aforementioned embodiments describe the invention applied to a parallel type transmission for a front engine rear drive (FR) vehicle. Finally, two embodiments will be described by embodying the invention with a transverse type transaxle for a front engine front drive (FF) or rear engine rear drive (RR) vehicle.

Figure 18:
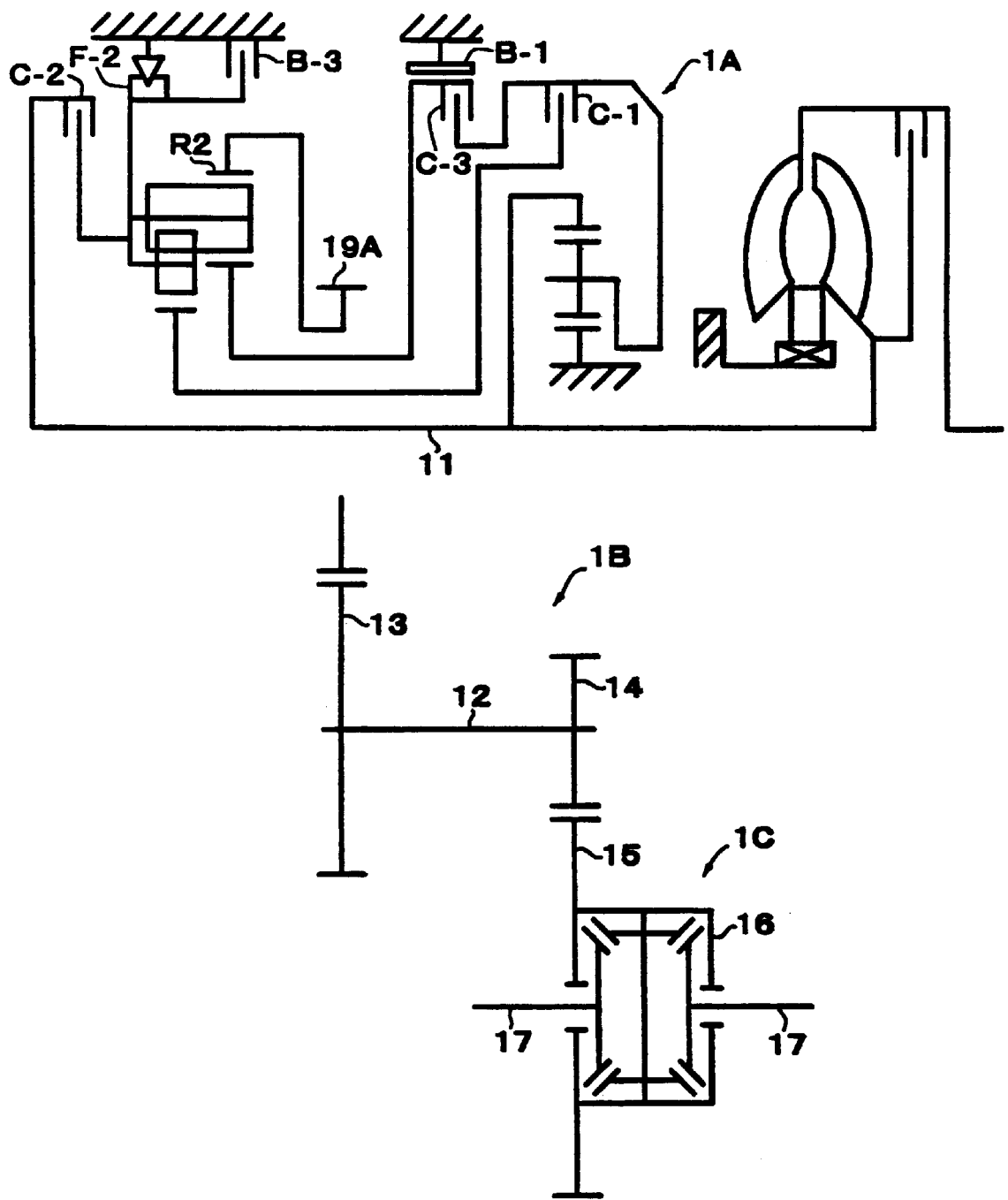
FIG. 18 is a schematic diagram illustrating the gear train of the fourteenth embodiment of the automatic transmission applied the invention.
Figure 19:
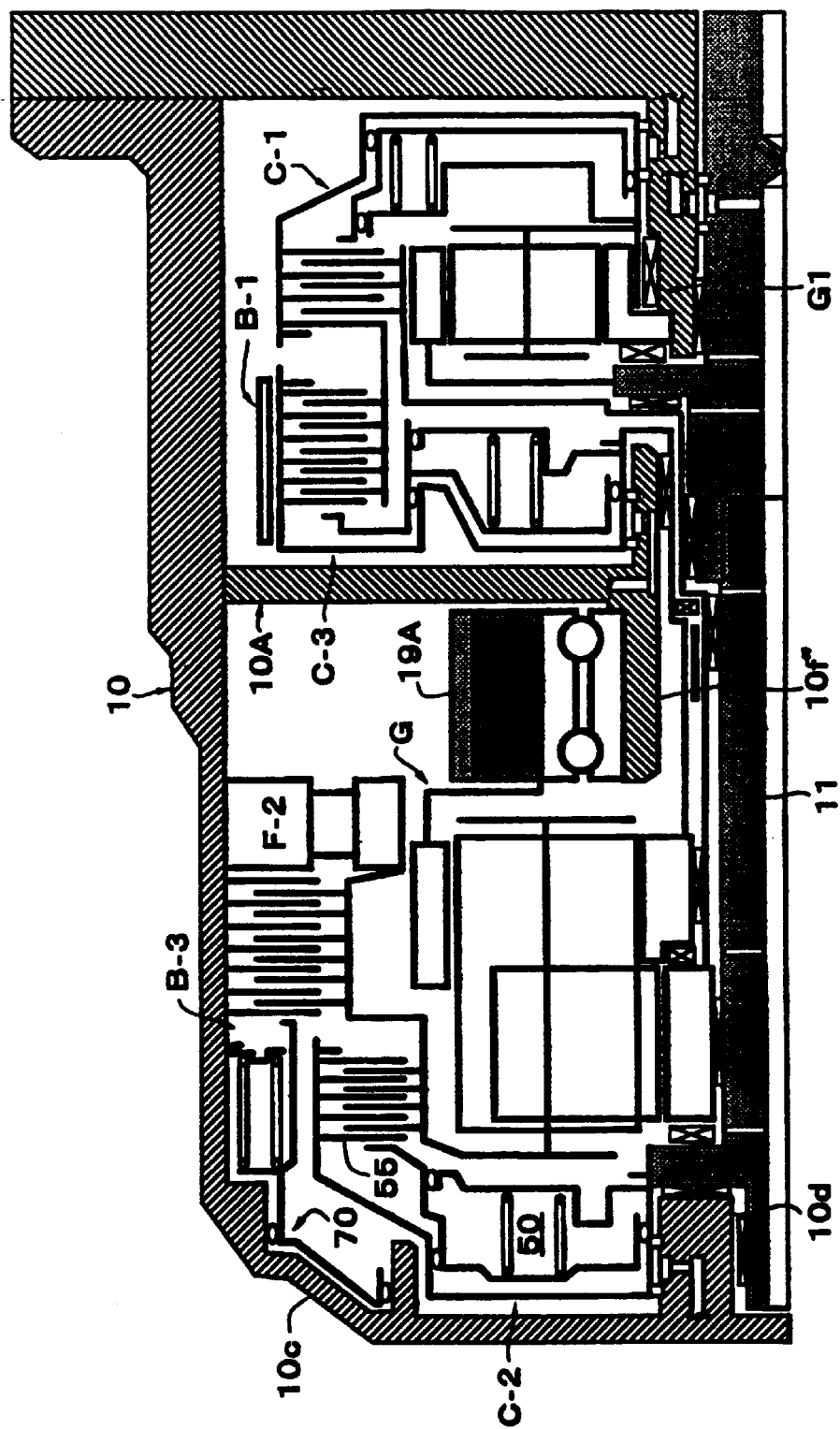
FIG. 19 is an axial cross sectional diagram illustrating the shift mechanism of the fourteenth embodiment.

FIG. 18 and FIG. 19 illustrate the fourteenth embodiment. In this embodiment, as shown by comparing the schematic diagram of the gear train of the first embodiment illustrated in FIG. 1 with the schematic diagram of the gear train of this embodiment, both embodiments have substantially the same structure, however, according to the transverse type, this embodiment has a three axis structure in which the shift mechanism 1A is arranged on a first axis, a counter gear mechanism 1B is arranged on a second axis and a differential unit is arranged on a third axis. Further, a counter drive gear 19A as the output member of the ring gear R2 is arranged on the first axis instead of the output shaft.

The counter gear mechanism 1B comprises a counter driven gear 13 and a differential drive pinion gear 14 which are fixed on a counter shaft 12. The counter driven gear 13 is engaged with the counter drive gear 19A at the axial middle portion. The differential drive pinion gear 14 is engaged with a differential ring gear 15 of the differential unit 1C at the frontmost portion of the shift mechanism. The differential unit 1C is fixed to the differential ring gear 15 and comprises a differential case 16 in which a differential gear is arranged. Both output shafts 17 of the differential gear are connected to vehicle wheels.

As illustrated with the cross sectional view of FIG. 19, in this embodiment, the counter drive gear 19A is arranged on the other side of the support wall 10A as the third clutch C-3. The support wall 10A comprises the cylindrical portion 10f" for supporting the counter drive gear 19A. The counter drive gear 19A is rotatably supported through a bearing on the cylindrical portion 10f".

In this embodiment, the axial size of the transmission mechanism is particularly limited compared to the aforementioned embodiments because of the vehicle mounting characteristic. Therefore, the combination of the one-way clutch and the brake, which is arranged in parallel with the brake B-1, is not used as in the fourth embodiment. In this embodiment, the arrangement relationship and the connection relationship of the planetary gear set G, reduction planetary gear G1, the first through third clutches (C-1 through C-3), and the brakes (B-1 through B-3) and the one-way clutch F-2 as the first and second engaging members are substantially the same as in the fourth embodiment.

The second clutch C-2 is arranged on the boss portion 10d of the transmission case 10 so that the hydraulic pressure is applied to the hydraulic servo 50 without going through the input shaft 11. According to that, the frictional member 55 of the second clutch C-2 is moved to the front side and arranged in the radial outer side of the planetary gear set G. The hydraulic servo 70 of the brake B-3 is arranged in the radial outer side of the hydraulic servo 50 of the second clutch C-2 and built in the rear end wall portion 10c of the transmission case 10.

FIG. 20 illustrates the fifteenth embodiment in which the order of all members of the shift mechanism is opposite from the fourteenth embodiment. In this embodiment, it is difficult to support the hydraulic servo 70 in the front end wall portion 10a, which is ordinarily formed by the oil pump body, of the transmission case 10 because of the hydraulic paths arrangement. Therefore, the hydraulic servo 70 of the brake B-3 is attached to the surrounding wall of the transmission case 10 in the radial outer side of the planetary gear set G. Therefore, the frictional member 55 of the second clutch C-2, which is moved from the radial outer side of the planetary gear set G to the front side, is able to be radially enlarged and the hydraulic servo 50 is also able to be radially enlarged by using the radial outer space of the frictional member 55. As a result, the number of frictional members 55 is reduced so that the axial size of the clutch is reduced. Accordingly, the axial size of the transmission is reduced.

Thus, the invention is described based on the multiple embodiments. The invention should not be limited to the foregoing embodiments but can be modified in various manners based on its advantages, and these modification should not be excluded from the scope of the invention.

What is claimed is:

1. An automatic transmission establishing multistage gear ratios for a vehicle comprising:

a reduction planetary gear;

a first clutch and a third clutch which transmit a decelerated rotation transmitted through at least the reduction planetary gear; and a planetary gear set which is inputted the decelerated rotation transmitted through the first and third clutches;

wherein the reduction planetary gear and the first and third clutches are arranged on one side of the planetary gear set;

the first and third clutches input the decelerated rotation transmitted through the reduction planetary gear to two different elements of the planetary gear set;

the third clutch is arranged closer to the planetary gear set than the first clutch;

an input side member of the first clutch is connected to an output element of the reduction planetary gear and an input side member of the third clutch; and an output side member of the first clutch is extended through an inner space of the third clutch and connected to one of the two elements of the planetary gear set.

2. The automatic transmission for a vehicle according to claim 1 wherein one element of the reduction planetary gear is fixed to a boss portion extended from a transmission case.

3. The automatic transmission for a vehicle according to claim 2 wherein the transmission case comprises a support wall, the first clutch is arranged on the boss portion, and the third clutch is arranged adjacent to the support wall.

4. The automatic transmission for a vehicle according to claim 3 wherein the third clutch is supported on a first cylindrical portion axially extended from the support wall.

5. The automatic transmission for a vehicle according to claim 4 wherein the input side member of the first clutch is a clutch drum, in which a hydraulic servo is provided, and arranged in order that a cylinder of the hydraulic servo opens to the reduction planetary gear.

6. The automatic transmission for a vehicle according to claim 4 wherein an output side member of the third clutch is a clutch drum, in which a hydraulic servo is provided, arranged in order that a cylinder of the hydraulic servo opens to the opposite side against the support wall, and connected to one element of the planetary gear set.

7. The automatic transmission for a vehicle according to claim 6 wherein a first engaging member is structured from a band brake in which the outer surface of the clutch drum of the third clutch is an engaging surface engaged by a band.

8. The automatic transmission for a vehicle according to claim 3 wherein the output element is a counter gear, and the counter gear is arranged on the other side of the support wall as the third clutch.

9. The automatic transmission for a vehicle according to claim 8 wherein the support wall comprises a second cylindrical portion supporting the counter gear.

10. The automatic transmission for a vehicle according to claim 2 wherein the transmission case comprises a support wall, the first clutch is arranged on one side of the support wall, and the third clutch is arranged on the other side.

11. The automatic transmission for a vehicle according to claim 10 wherein the first and third clutches are supported on a cylindrical portion axially extended from the support wall.

12. The automatic transmission for a vehicle according to claim 11 wherein the input side member of the first clutch is a clutch drum, in which a hydraulic servo is provided, and arranged in order that a cylinder of the hydraulic servo opens to the reduction planetary gear.

13. The automatic transmission for a vehicle according to claim 11 wherein an output side member of the third clutch is a clutch drum, in which a hydraulic servo is provided, arranged in order that a cylinder of the hydraulic servo opens to the opposite side against the support wall, and connected to one element of the planetary gear set.

14. The automatic transmission for a vehicle according to claim 13 wherein a first engaging member is structured from a band brake in which the outer surface of the clutch drum of the third clutch is an engaging surface engaged by a band.

15. The automatic transmission for a vehicle according to claim 1 wherein a first element of the planetary gear set is connected to the output side member of the first clutch, a second element of the planetary gear set is connected to an output side member of the third clutch which is engageable with a transmission case through a first engaging member, a third element of the planetary gear set is connected to an output side member of a second clutch, which is inputted a non-decelerated rotation and is engageable with a transmission case through a second engaging member, and a fourth element of the planetary gear set outputs shift rotations.

16. The automatic transmission for a vehicle according to claim 15 wherein the second clutch is arranged adjacent to the reduction planetary gear.

17. The automatic transmission for a vehicle according to claim 16 wherein a frictional member of the second clutch is arranged on the radial inner side of the frictional members of the first and third clutches.

18. The automatic transmission for a vehicle according to claim 16 wherein an input side member of the second clutch is a clutch drum, and the clutch drum is an input member inputting a rotation to the reduction planetary gear.

19. The automatic transmission for a vehicle according to claim 16 wherein the output side member of the second clutch is a clutch drum, in which a hydraulic servo is provided, arranged in order that the cylinder opens to the reduction planetary gear side, and the clutch drum is connected through an intermediate shaft to the third element of the planetary gear set.

20. The automatic transmission for a vehicle according to claim 19 wherein a frictional member, which connects between the input side member and the output side member, of the second clutch is arranged in the radial outer position of the reduction planetary gear, and a hub of the second clutch is integrated with an input member of the reduction planetary gear.

* * * * *